(12) United States Patent
Wu et al.

(10) Patent No.: US 7,523,198 B2
(45) Date of Patent: *Apr. 21, 2009

(54) INTEGRATED TESTING APPROACH FOR PUBLISH/SUBSCRIBE NETWORK SYSTEMS

(75) Inventors: John Wu, Eden Prairie, MN (US);
Benjamin L. Burnett, Prior Lake, MN (US); Matthias H. Wollnik, Seattle, WA (US)

(73) Assignee: Architecture Technology Corporation, Eden Prairie, MN (US)

( * ) Notice: Subject to any disclaimer, the term of this patent is extended or adjusted under 35 U.S.C. 154(b) by 467 days.

This patent is subject to a terminal disclaimer.

(21) Appl. No.: 11/486,575

(22) Filed: Jul. 14, 2006

(65) Prior Publication Data

US 2006/0259542 A1 Nov. 16, 2006

Related U.S. Application Data

(63) Continuation-in-part of application No. 10/057,574, filed on Jan. 25, 2002, now Pat. No. 7,096,264.

(60) Provisional application No. 60/802,176, filed on May 19, 2006.

(51) Int. Cl.
*G06F 15/173* (2006.01)
(52) U.S. Cl. .................. 709/224; 709/201; 709/202; 714/47
(58) Field of Classification Search .......... 709/224, 709/223, 201–202, 234; 714/25, 47, 48
See application file for complete search history.

(56) References Cited

U.S. PATENT DOCUMENTS

| | | | |
|---|---|---|---|
| 4,385,384 A | 5/1983 | Rosbury et al. | |
| 5,566,161 A | 10/1996 | Hartmann et al. | |
| 5,787,253 A | 7/1998 | McCreery et al. | |
| 5,878,420 A * | 3/1999 | de la Salle | 709/224 |
| 5,917,808 A | 6/1999 | Kosbab | |
| 6,085,243 A | 7/2000 | Fletcher et al. | |
| 6,108,782 A | 8/2000 | Fletcher et al. | |
| 6,219,050 B1 | 4/2001 | Schaffer | |
| 6,327,620 B1 * | 12/2001 | Tams et al. | 709/224 |
| 6,363,384 B1 | 3/2002 | Cookmeyer et al. | |
| 6,397,359 B1 | 5/2002 | Chandra et al. | |
| 6,421,319 B1 * | 7/2002 | Iwasaki | 709/224 |
| 6,519,723 B1 | 2/2003 | Allred et al. | |
| 6,584,501 B1 | 6/2003 | Cartsonis et al. | |
| 6,625,648 B1 | 9/2003 | Schwaller et al. | |
| 6,707,794 B1 * | 3/2004 | Leong et al. | 370/241 |

(Continued)

*Primary Examiner*—Philip B Tran
(74) *Attorney, Agent, or Firm*—Shumaker & Sieffert, P.A.

(57) ABSTRACT

The invention is directed to techniques for monitoring and testing publish/subscribe network systems. For example, an enterprise network that has a number of geographically dispersed network devices and interconnected sub-networks may be configured to operate as a publish/subscribe network system in which each of the dispersed network devices sends and receives messages for specific groups of the network devices. The techniques described herein enable data object capture and analysis in the application layer of a publish/subscribe network system using shim adapters. The techniques also enable network packet capture and analysis in the network layer of a publish/subscribe network system. Furthermore, the techniques include integrated analysis of testing results from the application layer and the network layer to determine performance characteristics, such as latency, across both of the layers. In this way, the techniques provide more accurate measurements of performance characteristics in publish/subscribe network systems.

48 Claims, 19 Drawing Sheets

U.S. PATENT DOCUMENTS

| | | | |
|---|---|---|---|
| 6,714,513 B1 * | 3/2004 | Joiner et al. | 370/224 |
| 6,810,017 B1 | 10/2004 | Leong et al. | |
| 6,836,466 B1 | 12/2004 | Kant et al. | |
| 7,222,255 B1 * | 5/2007 | Claessens et al. | 709/224 |
| 7,287,072 B1 * | 10/2007 | Dispensa et al. | 709/224 |
| 2003/0023710 A1 | 1/2003 | Corlett et al. | |
| 2003/0142670 A1 | 7/2003 | Gould et al. | |
| 2003/0145039 A1 | 7/2003 | Bonney et al. | |
| 2006/0007858 A1 * | 1/2006 | Fingerhut et al. | 370/229 |

* cited by examiner

INTEGRATED TESTING APPROACH FOR PUBLISH/SUBSCRIBE NETWORK SYSTEMS

This application is a continuation-in-part of U.S. patent application Ser. No. 10/057,574, filed Jan. 25, 2002, and claims the benefit of U.S. Provisional Application No. 60/802,176, filed May 19, 2006, the entire contents of which are incorporated herein by reference.

STATEMENT REGARDING FEDERALLY SPONSORED RESEARCH OR DEVELOPMENT

This invention was made with Government support under Contract F30602-03-C-0057 awarded by the United States Air Force. The Government has certain rights in this invention.

TECHNICAL FIELD

The invention relates to computer networks and, more particularly, to techniques for monitoring and testing computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Dividing the data into packets has several advantages including enabling the source device to resend only those individual packets that may be lost during transmission.

The packets are communicated according to a communication protocol that defines the format of the packet. A typical packet, for example, includes a header carrying source and destination information, as well as a payload that carries the actual data. The de facto standard for communication in conventional packet-based networks, including the Internet, is the Transmission Control Protocol/Internet Protocol (TCP/IP).

A system administrator or other user often makes use of a protocol analyzer to monitor network traffic and debug network problems. In general, a protocol analyzer is a tool that captures data from a network and displays the data to the user. The protocol analyzer typically allows the user to browse the captured data, and view summary and detail information for each packet. Accordingly, the user can view the network traffic between devices on the network.

The number of devices within conventional networks has increased dramatically in recent years. A large number of enterprises, for example, have geographically dispersed operations, and typically have a local area network (LAN) supporting the information processing needs at each of these locations. These dispersed operations may be connected by leased lines or virtual private networks (VPN). Accordingly, the network traffic within an enterprise has increased in volume, as well as complexity. Furthermore, a typical enterprise network may have a number of routers and switches that provide alternate routes for traffic flow. Consequently, conventional protocol analyzers do not provide sufficient insight into traffic conditions across large networks.

SUMMARY

In general, the invention is directed to techniques for monitoring and testing publish/subscribe network systems. For example, an enterprise network that has a number of geographically dispersed network devices and interconnected sub-networks may be configured to operate as a publish/subscribe network system in which each of the dispersed network devices sends and receives messages for specific groups of the network devices. The techniques described herein enable data object capture in the application layer of a publish/subscribe network system using shim adapters and subsequent analysis. The techniques also enable data object capture in the network layer of a publish/subscribe network system and subsequent analysis. Furthermore, the techniques include integrated analysis of testing results from the application layer and the network layer to determine performance characteristics, such as latency, across both of the layers. In this way, the techniques provide more accurate measurements of performance characteristics in publish/subscribe network systems.

In one embodiment, the invention is directed to a method comprising generating a test scenario for a publish/subscribe network system, and issuing commands to a plurality of agents positioned at different locations within the publish/subscribe network system to initiate the test scenario. The method also comprises capturing data objects propagating between publish/subscribe clients and the publish/subscribe network system according to the test scenario with the plurality of agents, and communicating results of the test scenario including the captured data objects to an analyzer coupled to the publish/subscribe network system. Further, the method includes analyzing the results of the test scenario to determine performance characteristics of the publish/subscribe network system.

In another embodiment, the invention is directed to a computer-readable medium comprising instructions. The instructions cause a programmable processor to generate a test scenario for a publish/subscribe network system, and issue commands to a plurality of agents positioned at different locations within the publish/subscribe network system to initiate the test scenario. The instructions also cause the programmable processor to capture data objects propagating between publish/subscribe clients and the publish/subscribe network system according to the test scenario with the plurality of agents, and communicate results of the test scenario including the captured data objects to an analyzer coupled to the publish/subscribe network system. In addition, the instructions cause the programmable processor to analyze the results of the test scenario to determine performance characteristics of the publish/subscribe network system.

In a further embodiment, the invention is directed to a system comprising a publish/subscribe network system, a publish/subscribe clients coupled to the publish/subscribe network system, a plurality of agents positioned at different locations within the publish/subscribe network system, and an analyzer coupled to the publish/subscribe network system including a controller that generates a test scenario for the publish/subscribe network system and issues commands to the plurality of agents to initiate the test scenario. The plurality of agents capture data objects propagating between the publish/subscribe clients and the publish/subscribe network system according to the test scenario, and communicate results of the test scenario including the captured data objects to the analyzer. The analyzer analyzes the results of the test scenario to determine performance characteristics of the publish/subscribe network system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
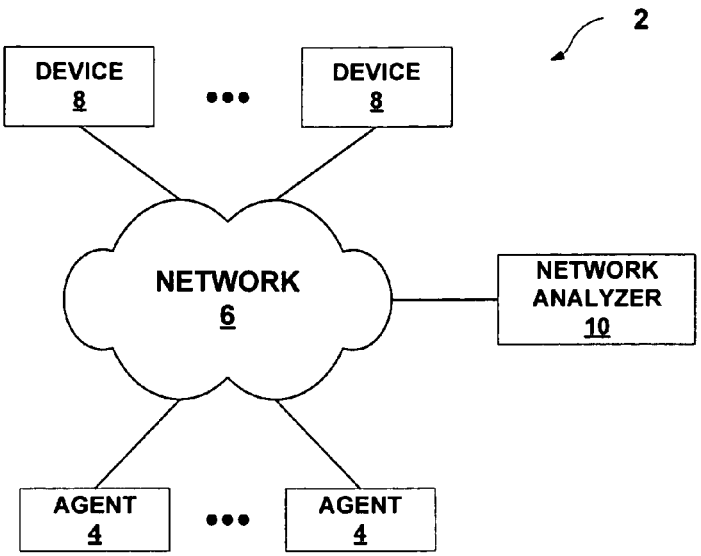
FIG. 1 is a block diagram illustrating an example network environment in which a network analyzer allows a user to monitor and test an enterprise network that may include a number of routers and geographically separate subnets.

FIG. 1 is a block diagram illustrating an example network environment 2 in which a network analyzer 10 allows a user to monitor and test a network 6. Network 6 may be a geographically dispersed network interconnecting a plurality of network devices 8. Network devices 8 represent devices capable of packet-based communication via network 6, including servers, workstations, network printers and faxes, gateways, routers, and the like.

Network analyzer 10 controls one or more agents 4 coupled to network 6 for monitoring and capturing network traffic. For example, network analyzer 10 issues commands to initiate and terminate data capture by agents 4. Upon completing the capture, agents 4 communicate the captured data to network analyzer 10, which aggregates the data to provide a complete view of traffic throughout network 6.

Agents 4 may be implemented in hardware, software, or any combination thereof. For example, agents 4 may comprise software processes that execute within dedicated computers or other hardware coupled to network 6. Agents 4 may comprise dedicated nodes coupled to network 6, as illustrated in FIG. 1, or may be installed within existing nodes of network 6, such as devices 8.

To make use of agents 4, network analyzer 10 maintains information identifying the available agents 4 throughout network 6 that can be controlled to capture network traffic. Network analyzer 10 may, for example, periodically broadcast messages to search for and identify agents 4. In addition, agents 4 may send notices when they start execution and are available for use.

Once network analyzer 10 retrieves and aggregates the data captured by agents 4, network analyzer 10 outputs a graphical display that provides a number of views of the network activity. By capturing data using one or more distributed agents 4, network analyzer 10 provides a broad view of the activity of network 6.

In addition, network analyzer 10 allows a user to create replay scenarios for testing and debugging network 6. The user can, for example, make use of the captured data and direct agents 4 to recreate the network activity by replaying the captured data, with or without modification.

Figure 2:
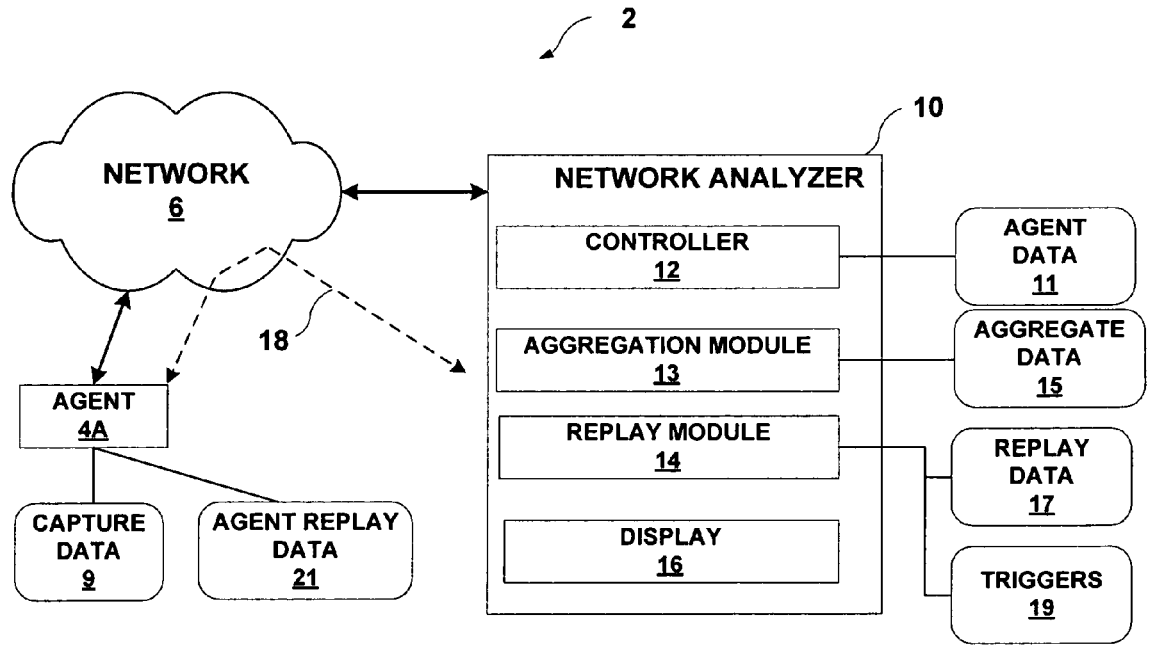
FIG. 2 is a block diagram illustrating a portion of the network environment in further detail.

FIG. 2 is a block diagram illustrating a portion of network environment 2 in further detail. Network analyzer 10 includes controller 12 that coordinates the operation of agents 4, such as agent 4A as illustrated in FIG. 2. Controller 12 communicates with agent 4A by issuing commands to, and receiving responses from, communication link 18. Communication link 18 may comprise, for example, one or more sockets maintained by controller 12 and agent 4A for communicating TCP/IP messages. Controller 12 may spawn one or more software processes or threads for communicating with individual agents 4. Controller 12 maintains agent data 11 that describes the available agents 4 within environment 2. Agent data 11 may contain, for example, Internet Protocol (IP) addresses for the each agent 4 and port identifiers for communicating with agents 4.

In response to commands received from controller 12, agent 4A monitors packets on network 6, and generates capture data 9. Agent 4A may generate capture data 9 in a variety of forms, including text files, databases, and the like, and stores capture data 9 on a computer-readable medium. Upon completing the capture, agent 4A communicates the captured data to aggregation module 13 via communication link 18.

Aggregation module 13 aggregates capture data 9 from agent 4A with data captured by other agents 4 to provide a broad view of traffic throughout network 6. In particular, aggregation module 13 generates aggregate data 15, and outputs views of aggregate data 15 on display 16. For example, in one view, aggregation module 13 graphically illustrates the conversations that occurred between devices 8 (FIG. 1) during the capture. The user can select one of the conversations to further analyze the streams of packets associated with the selected conversation. In another view, aggregation module 13 graphically illustrates the physical layout of network 6 based on the captured data. The user can filter the views based on protocols, and the source and destination addresses.

By generating aggregate data 15 from capture data 9 of one or more distributed agents 4, aggregation module 13 provides a broad view of the activity of network 6. A packet communicated from a source device to a destination device, however, may be captured via a number of different agents 4 as the packet traverses network 6. In other words, different agents 4 at different points in time may capture the same packet as the packet traverses network 6. To present a clear illustration of network activity, aggregation module 13 identifies duplicate packets captured by different agents 4. More specifically, when the user views a packet stream for a particular conversation between devices 8, aggregation module 13 filters the duplicate packets, and presents the non-duplicate packets to the user. In this manner, aggregation module 13 presents the network traffic in a manner that can be more readily understood by the user.

For a packet that was captured by multiple agents 4, aggregation module 13 may present a representative one of the duplicate packets, such as the earliest packet that was captured. In response to input from the user, aggregation module 13 displays the other duplicate packets, thereby allowing the user to view information describing the packet's trip across network 6. Alternatively, aggregation module 13 may display only the duplicate packets to the user to provide a clear illustration of a packet's travel across a network.

In addition to providing various views of the activity of network 6, network analyzer 10 allows a user to create complex replay scenarios for testing and debugging network 6. In particular, replay module 14 allows the user to define a replay scenario that includes one or more sets of packets captured by agents 4. The user can define settings for the replay of each set, such as alterations to be made to the packets by agents 4, the number of loops to replay the packets, trigger conditions to initiate the replay, and the like. Based on the settings, replay module 14 generates replay data 17 and associates portions of the replay data 17 with agents 4. Upon generating replay data 17, replay module 14 sends respective portions of replay data 17 to the agents 4 for storage as agent replay data 21, and starts the replay. In this manner, agents 4 introduce replay data 21 to network 6 in under the direction of network analyzer 10, thereby recreating traffic patterns or other network activity.

To create sophisticated replay scenarios, replay module 14 allows the user to define triggers 19 that may be distributed to agents 4. For example, the user may define a trigger for replaying of a particular packet or set of packets of replay data 17 upon completion of a different portion of replay data 17. The user may also define triggers based on network events, such as the detection of specified network packets, the receipt of network messages or signals, and the like. Upon creation of triggers 19, replay module 14 communicates the trigger information to the appropriate agents 4.

When a trigger fires, i.e., when the requisite conditions defined by the trigger have been satisfied, agents 4 send notices to the replay module 14 via communication link 18. Upon receiving a notice, replay module 14 determines whether the notice triggers another set of packets to be replayed. If the conditions have been met, replay module 14 sends a signal directing the corresponding agent 4 to start replaying the corresponding portion of agent replay data 21. These techniques allow for advanced distributed replay and testing scenarios for network 6.

After a replay scenario has completed, aggregation module 13 retrieves from agents 4 capture data 9 that was observed during the replay. The capture data 9 can be compared to the original replay data 17 that was sent to the agents 4. Comparing a replay scenario to the capture data 9 allows a similarity computation to be made that indicates whether observed behavior of network 6 is consistent with the expected behavior based on the replay data 17.

Figure 3:
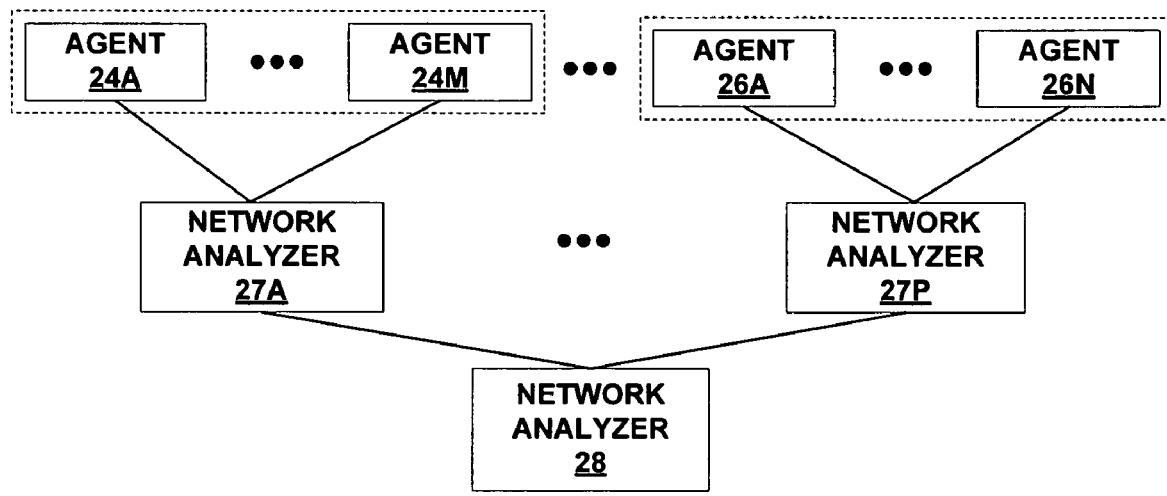
FIG. 3 is a block diagram illustrating the versatility of the network analysis and testing techniques described herein.

FIG. 3 is a block diagram illustrating the versatility of the network analysis and testing techniques described herein. In particular, network analyzers 27, 28 may be hierarchically configured. Network analyzer 27A, for example, receives and aggregates data captured by a set of agents 24A through 24M. Similarly, network analyzer 27P receives and aggregates data captured by a set of agents 26A through 26M. Network analyzer 28 provides a second level of aggregation, and receives the aggregated data from aggregation modules 27. In general, any number of network analyzers can be used, and can be coupled in any number of levels, with a root network analyzer providing a comprehensive interface to the user. In this manner, the network analyzers can be expanded to cover large enterprise networks that typically have a number of subnets. Further, by nesting the network analyzers throughout various levels of a large enterprise network a more coherent picture of network activity can be obtained.

Figure 4:
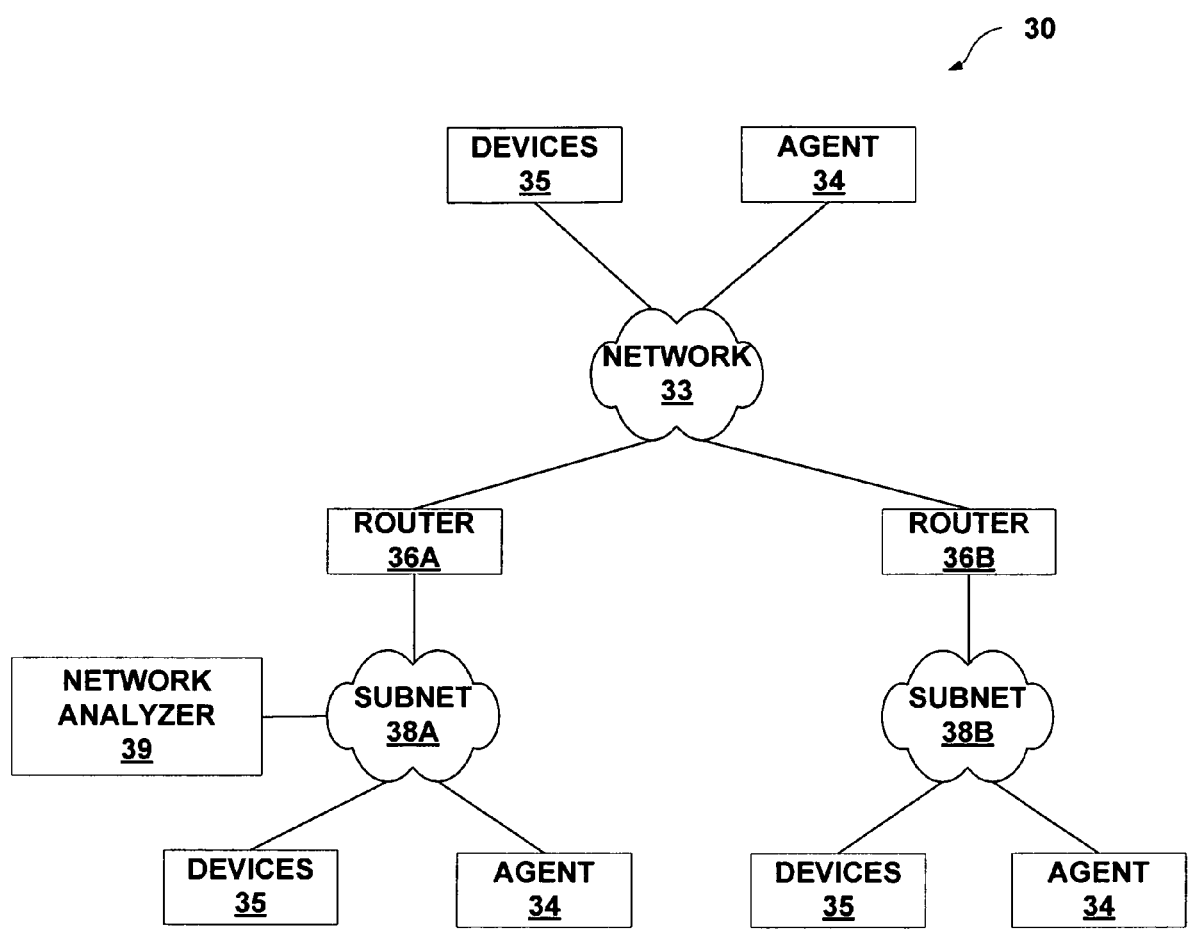
FIG. 4 is a block diagram that illustrates another example deployment of the network analyzer within an enterprise network environment.

FIG. 4 is a block diagram that illustrates an example deployment of the network analyzer 39 within an enterprise network environment 30. Environment 30 includes network 34 and two routers 16 that manage two sub-networks: subnet 38A and subnet 38B. To monitor and capture network traffic between devices 35 within the various regions of network environment 30, network analyzer 39 makes use of distributed agents 34. Notably, each subnet 38, as well as network 33, includes at least one agent 34. Accordingly, network analyzer 39 can provide a broad view of the activity of network environment 30, and can recreate traffic patterns and other network events within the various regions of network environment 30.

Figure 5:
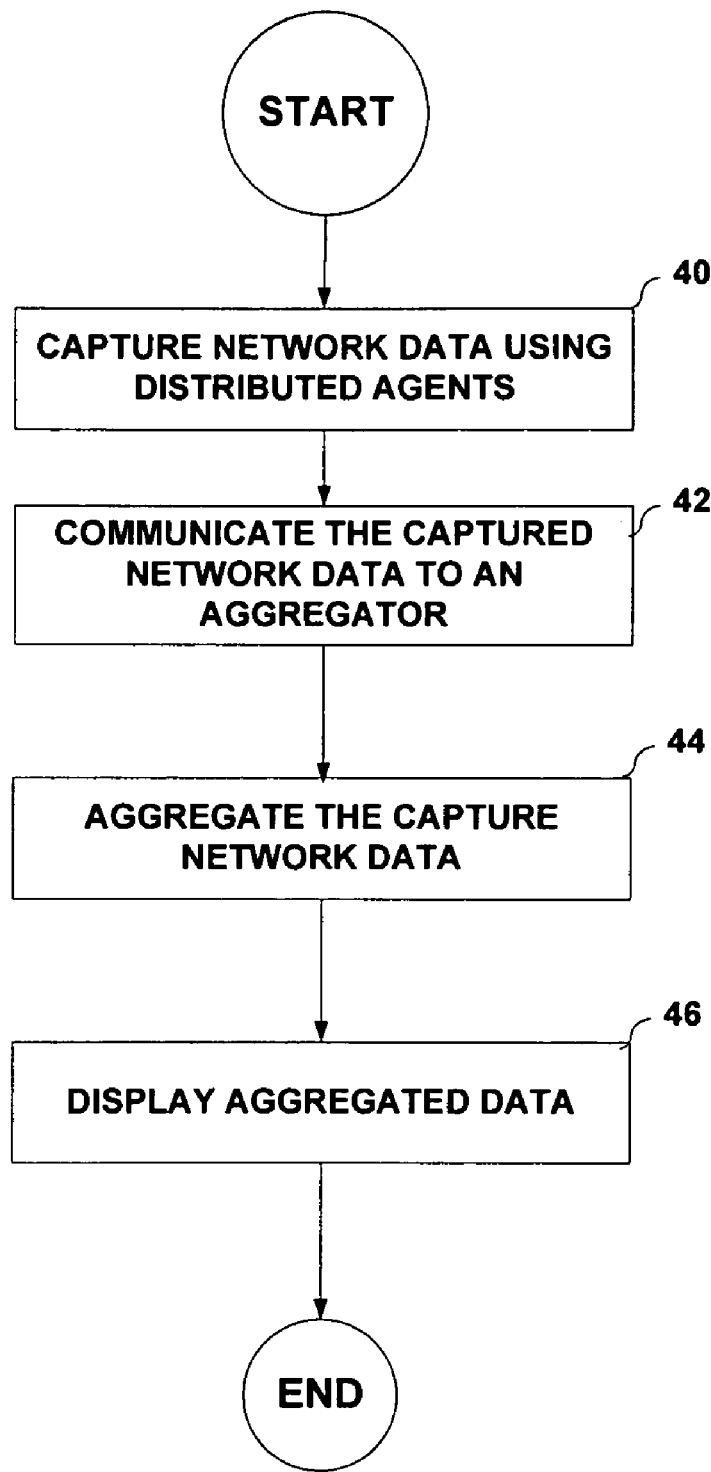
FIG. 5 is a flowchart that illustrates example operation of the network analyzer.

FIG. 5 is a flowchart that illustrates example operation of the network analyzer, such as network analyzer 10 (FIG. 1), network analyzer 27 or 28 (FIG. 3), or network analyzer 39 (FIG. 4), hereafter network analyzer 10 for simplicity. Initially, network analyzer 10 directs agents to capture network traffic (40). For example, network analyzer 10 issues commands to initiate and terminate data capture by agents 4. Upon completing the capture, agents 4 communicate the captured data to aggregation module 13 of network analyzer 10 (42), which aggregates the data to provide a complete view of traffic throughout network 6 (44). Once network analyzer 10 retrieves and aggregates the data captured by agents 4, network analyzer 10 outputs a graphical display that provides a number of views of the network activity (46).

Figure 6:
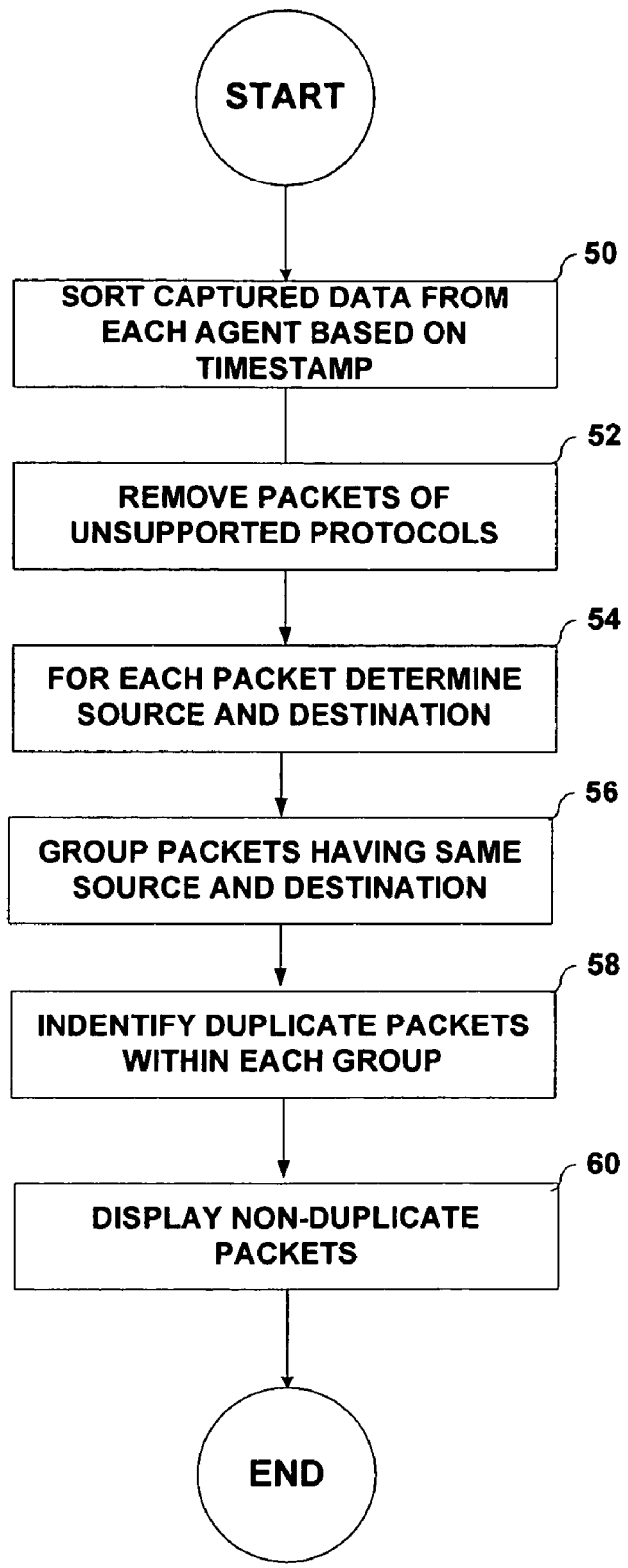
FIG. 6 is a flowchart that illustrates the operation of an aggregation module of the network analyzer.

FIG. 6 is a flowchart that further illustrates the operation of aggregation module 13 of network analyzer 10. Upon receiving capture data 9 from agents 4, aggregation module 13 sorts the capture data 9 from each agent based on an associated timestamp (50). Agents 4, for example, timestamp each packet upon capturing the packet from network 6. Next, aggregation module 13 may filter any packets that do not conform to a supported protocol (52). For example, aggregation module 13 may filter any packet not conforming to the TCP/IP protocol.

After filtering unsupported packets, aggregation module 13 determines the source device and destination device for each packet (54). In particular, aggregation module 13 examines source information contained with each packet and determines the respective source device that originated each packet. For example, the source information may comprise a media access control (MAC) address or a Data Link Control (DLC) address for a network interface card (NIC) of the source network device. Similarly, aggregation module 13 examines destination information contained with each packet, and determines the destination device for which each packet is destined.

Next, aggregation module 13 identifies and groups packets within the captured data 9 from the agents 4 that have the same source and destination information (56). In this manner, aggregation module identifies the various conversations between devices 8 coupled to network 6.

After grouping the packets based on source and destination information, aggregation module 13 traverses each group of packets and identifies duplicate packets within each group (58). As described above, these duplicate packets are typically multiple images of the same packet captured by different agents 4 at different points in time as the packet traverses network 6. To identify the duplicate packets, aggregation module 13 first identifies network packets that use the TCP protocol and that have equal sequence numbers and acknowledgement numbers. Next, aggregation module 13 performs a comparison for payloads of the identified packets to confirm that the packets are indeed duplicates. For example, aggregation module 13 may perform a byte-by-byte comparison of the payloads. For non-TCP packets, aggregation module 13 determines the originator of the packet, and examines the payload of the packet as well as the time stamp of the packet to ascertain and identify duplicate packets.

Finally, in response to a user request to view a particular conversation, aggregation module 13 displays the non-duplicate packets of the respective group of packets (60). For a packet that was captured by multiple agents 4, aggregation module 13 may present a representative one of the duplicate packets, such as the earliest or latest packet that was captured. In response to further input from the user, aggregation module 13 may display the duplicate packets, thereby allowing the user to view information describing the packet's trip across network 6. In other words, by identifying duplicate packets, aggregation module 13 may provide multiple advantages, depending on the information sought by the user of network analyzer 10. In one case, duplicate packets are removed so that only one representation of each packet is displayed in a network snapshot of packet activity. In an alternative case, identified duplicates are displayed to provide details of the displayed packet's trip across network 6.

Figure 7:
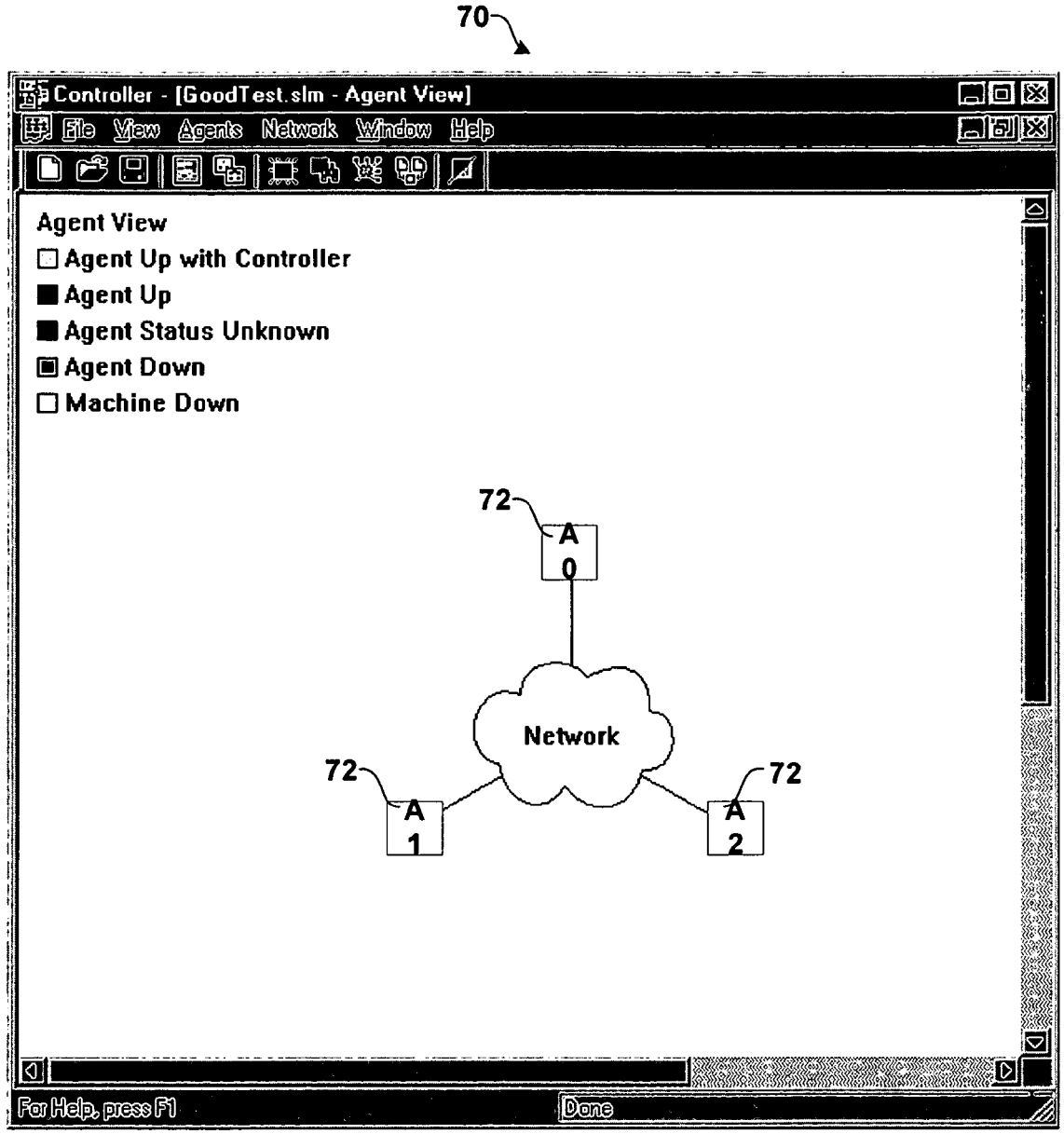
FIGS. 7-12 illustrate example user interfaces presented by the network analyzer.

FIGS. 7-12 illustrate exemplary user interfaces presented by the network analyzer 10. FIG. 7 illustrates an example user interface 70 presented by network analyzer that provides a graphical view of the network environment and the detected agents 72. Specifically, user interface 70 depicts the state of each of the detected agents 72, and whether the agents reside on the same network node as controller 12 of network analyzer 10.

Figure 8:
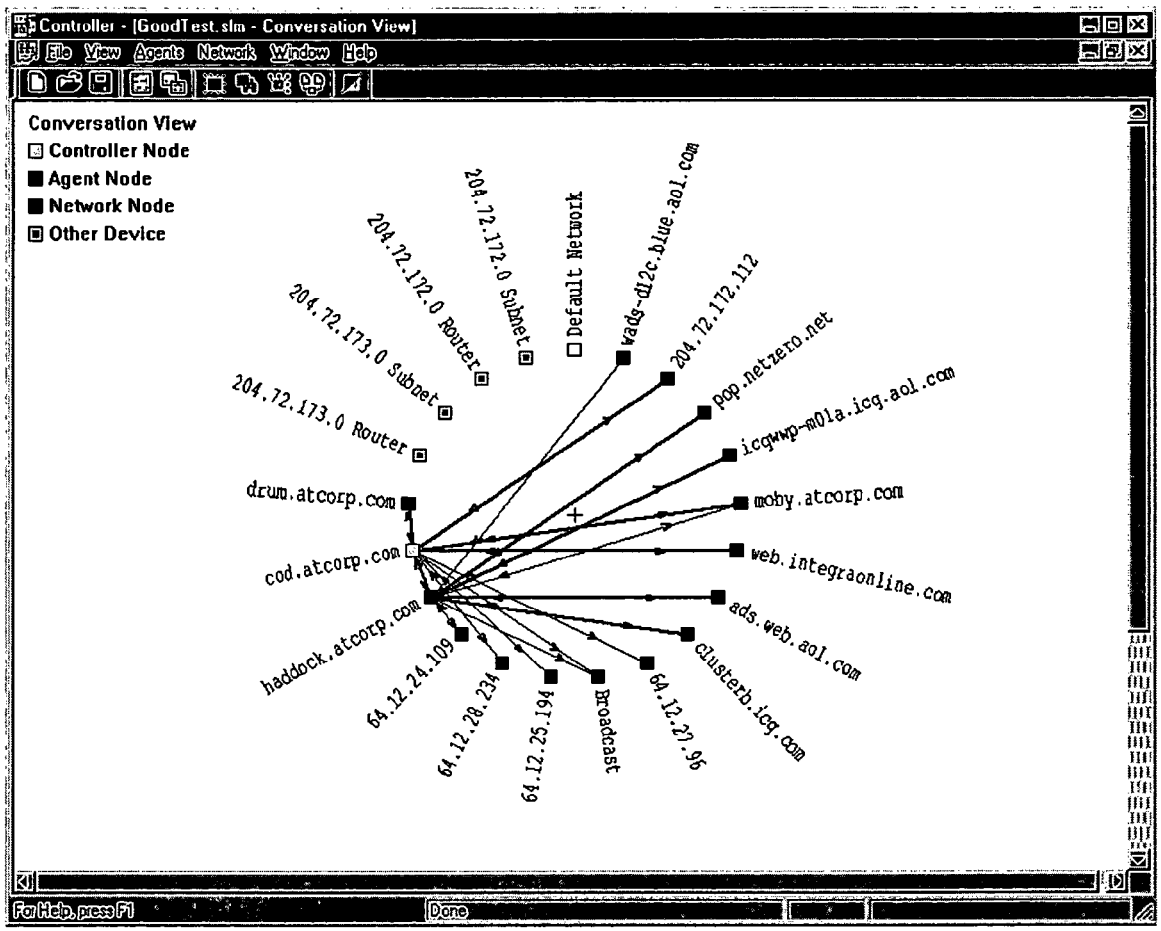

FIG. 8 illustrates an example user interface 74 presented by network analyzer 10 that provides a graphical view of the conversation present within the network. Specifically, aggregation module 13 of network analyzer 10 graphically illustrates each node, including devices, routers, and the like, that are detected based on aggregate data 15. In addition, aggregation module 13 graphically presents a communication link between each source and destination device that have associated groups of packets within the aggregate data 15.

The user may filter user interface 74 based on a variety of criteria, such as protocols, network addresses, and the like. In addition, the user can hide selected nodes from view to help reduce display clutter. For example, by holding the mouse over a conversation link, the user can direct user interface 74 to display the number of packets captured for the conversation, as well as list of protocols in the conversation. By clicking a conversation link, the user can direct network analyzer 10 to display a viewer to allow the user to drill down into the conversation.

Figure 9:
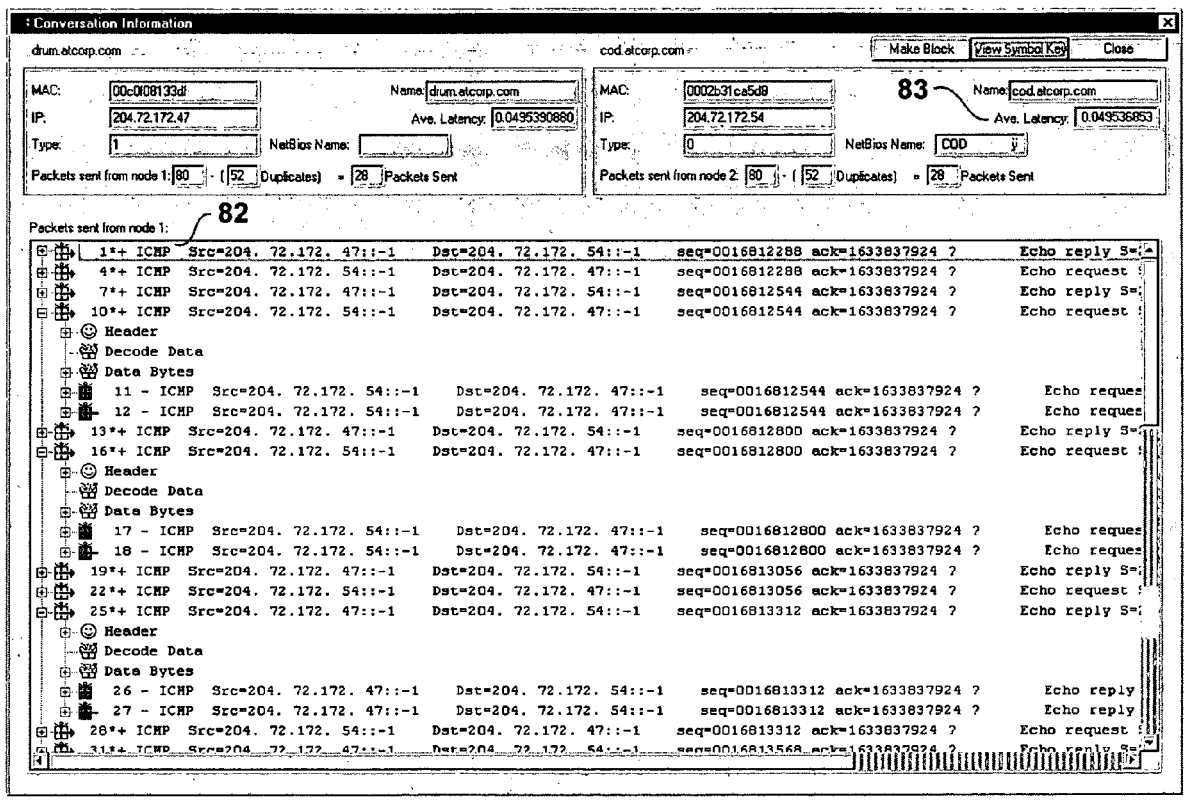

FIG. 9 illustrates an example user interface 80 presented by network analyzer 10 that presents a set of packets captured for a particular conversation. Specifically, user interface 80 provides a decode summary 82, which displays the source and destination for each packet. As described in detail above, network analyzer 10 identifies all of the duplicate packets associated with the conversation after capture data 9 has been aggregated from the agents 4. User interface 80 illustrates one example in which network analyzer 10 presents the non-duplicate packets to provide a clear view of the conversation. In particular, for each set of duplicate packets, network analyzer 10 displays a "representative" packet. In this case, network analyzer 10 determines which of the duplicate packets was transmitted earliest, and includes the packet within user interface 80.

Network analyzer 10 displays a graphical icon, i.e., the plus sign, that the user can select to expand the representative packet, causing user interface 80 to reveal the header data, decoded data, or the "raw" hexadecimal data for the duplicate packets.

Figure 10:
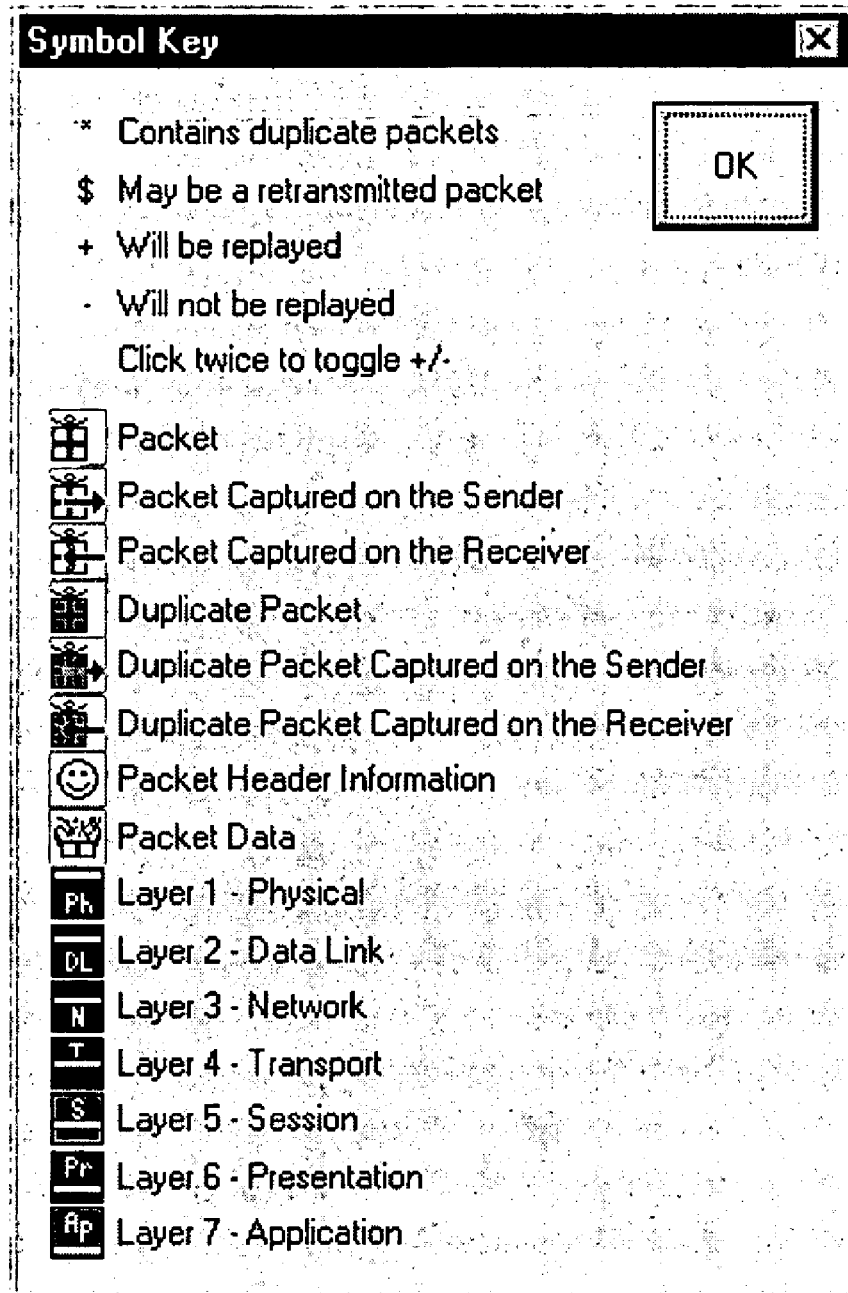

As illustrated by user interface 80, packet #10 has an icon, i.e., a package with an outgoing arrow, indicating the packet was captured on the network device that sent it. Network analyzer 10 makes this determination by comparing the source information, such as the MAC address, of the packet with the information for the agent that captured the packet. Furthermore, packet #11 is a duplicate to packet #10, and was captured on a machine that was not involved directly in the communication. Finally, user interface 80 illustrates packet #12 as having been captured on the actual destination device. By looking at the timestamps on each of these packets, and adjusting for clock differences between the devices, network analyzer 10 computes a latency 83 for the packet, and other packets, and then compute an average latency between the source and destination devices. FIG. 10 illustrates a legend 84 indicating to the user a number of graphical symbols supported by user interface 80.

Figure 11:
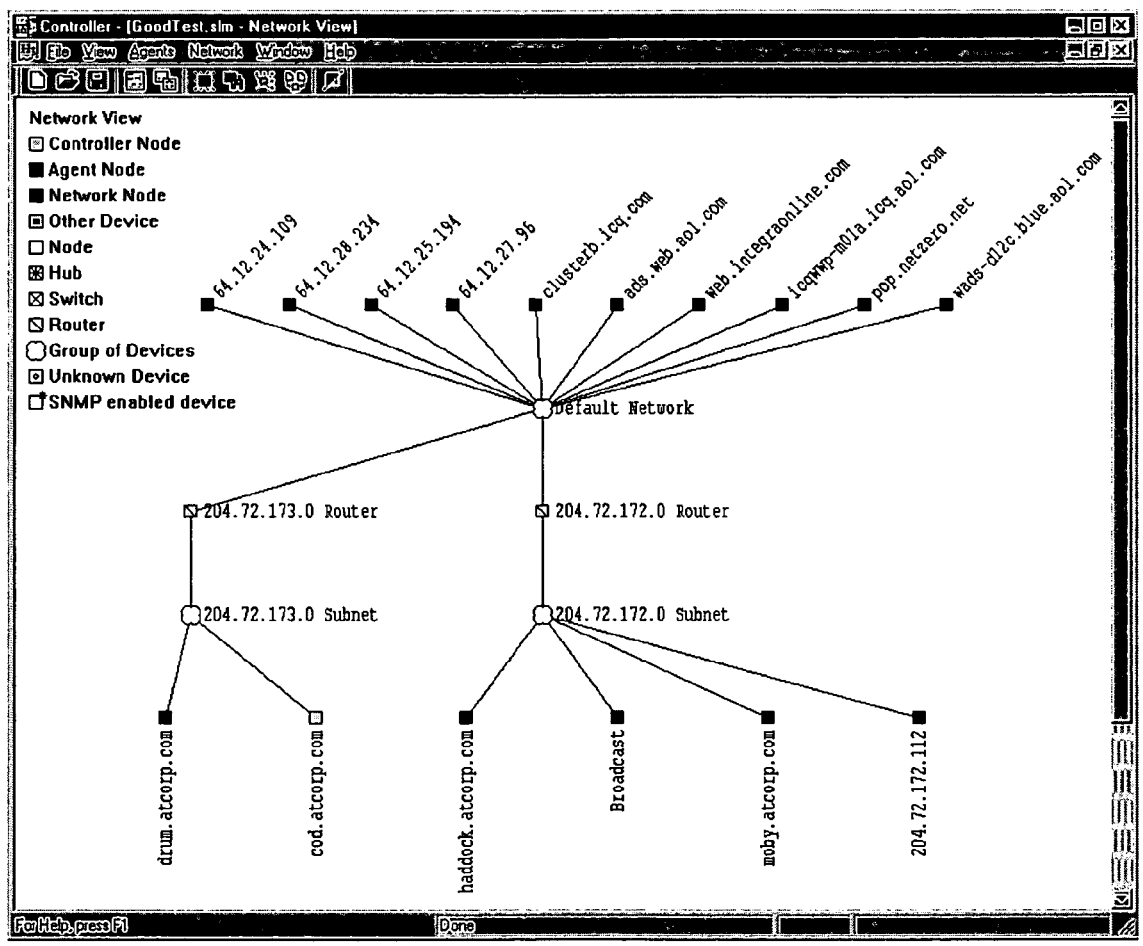

FIG. 11 illustrates an example user interface 90 presented by network analyzer 10 that illustrates the physical layout of the network. In particular, network analyzer 10 generates this view based on the captured data 9 gathered by each agent 4. For example, network analyzer 10 typically determines the interfaces and addresses for the agents 4, as well as routers that control the network or subnets of the agents 4.

Figure 12:
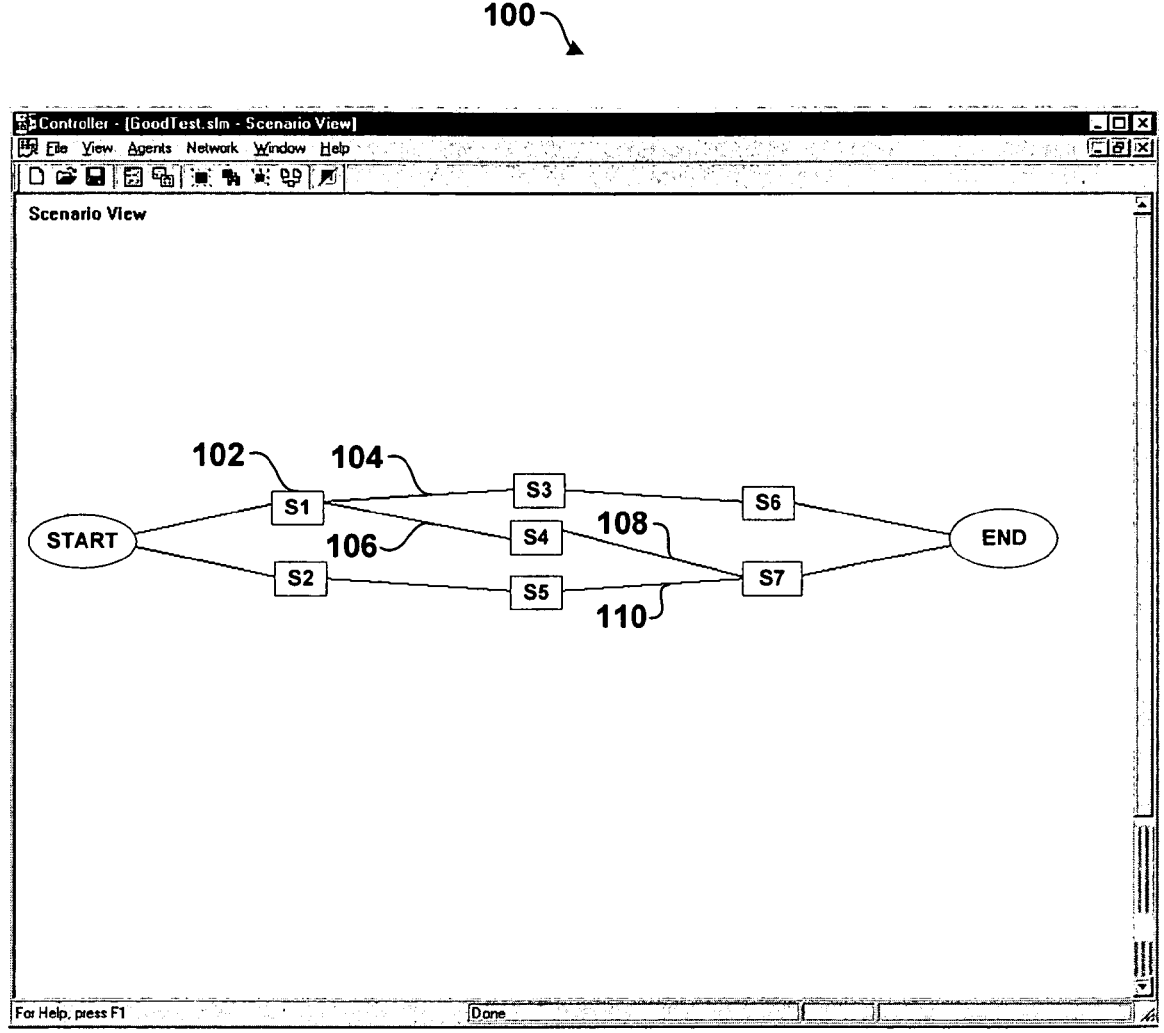

FIG. 12 illustrates an example user interface 100 presented by replay module 14 of network analyzer 10 by which the user can graphically create complex replay scenarios. More specifically, user interface 100 allows the user to create a conditional flow to control the introduction of one or more sets of network packets (S1-S7) of replay data 17. To create the sets of packets, the user can select one or more packets from aggregate data 15, and mark the selected packets for replay. In addition, the user associates each set with a respective agent 4 for introducing the set of packets to the network as directed by replay module 14. Upon selecting one of the sets S1-S7, the user can configure replay settings for the selected set such as the type of replay, alterations to make to the packets, the number of loops for the replay, and the like.

In addition, user interface 100 allows the user to define a number of triggers, illustrated as lines connecting the sets of packets S1-S7, that define a control flow for introducing the sets S1-S7. Each trigger defines one or more conditions that, if satisfied, indicate the subsequent set of packets 102 is to be replayed by the associated agent. For example, in the replay scenario illustrated by user interface 100, the completion of set S1 satisfies triggers 104 and 106, which lead to the replaying of both blocks S3 and S4. As another example, the agent 4 associated with set S7 begins introducing the network packets of set S7 when both sets S4 and S5 have completed, thereby satisfying both triggers 108 and 110, respectively.

As described above, replay module 14 of network analyzer 10 coordinates the initiation of each block based on signals received from agents 4. When a trigger fires, i.e., when the requisite conditions defined by the trigger have been satisfied, agents 4 send notices to the replay module 14 via communication link 18 (FIG. 2). Upon receiving a notice, replay module 14 determines whether the notice triggers another set of packets to be replayed. If the conditions have been met, replay module 14 sends a signal directing the corresponding agent 4 to start replaying the corresponding portion of replay data 17 that has previously been communicated to agents 4 and stored as agent replay data 21. This block/trigger architecture allows the user to create advanced replay and testing scenarios.

To this point, techniques have been described for monitoring and testing a computer network. The described techniques provide insight into traffic patterns within computer networks that tend to have a number of geographically dispersed network devices and interconnected sub-networks. In addition, the techniques are useful in detecting and simulating network errors or other conditions. A network analyzer coupled to the computer network may receive captured network data from agents coupled to the computer network. The network analyzer may include an aggregation module that aggregates the captured data for display to a user of the network analyzer.

In addition, the network analyzer may include a replay module that allows the user of the network analyzer to define a replay scenario that includes one or more sets of packets captured by the agents. The user may select the one or more sets of packets from the aggregated packet data. The replay module then generates replay data from the selected packets and sends respective portions of the replay data to the agents. In this manner, the agents introduce the replay data to the computer network based on instructions from the network analyzer, thereby recreating traffic patterns or other network activity to test the computer network.

The techniques described above may be performed for a variety of computer networks, such as enterprise networks that have a number of geographically dispersed network devices and interconnected sub-networks. In some cases, enterprise networks may be configured to operate as publish/subscribe network systems in which each of the dispersed network devices may send and receive messages for specific groups of the network devices. Messaging services, such as publish/subscribe network systems, are becoming more prevalent as consumers look for easier ways for members of groups to share information with one another. Techniques for monitoring and testing a publish/subscribe network system will be described in more detail below.

Figure 13:
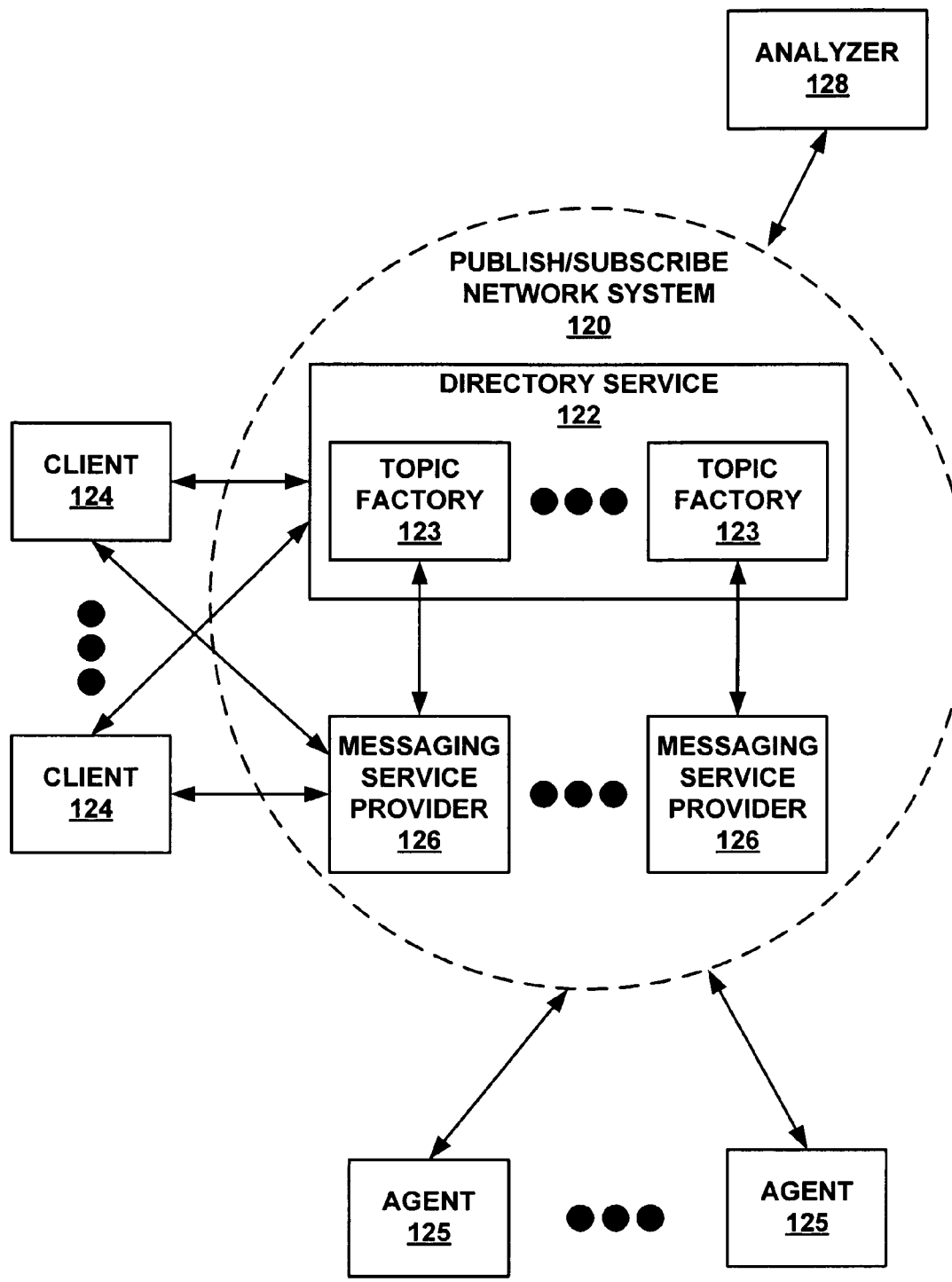
FIG. 13 is a block diagram illustrating an example publish/subscribe network system and dispersed network devices, i.e., clients, that send or receive messages for specific groups of clients via the publish/subscribe network system.

FIG. 13 is a block diagram illustrating an example publish/subscribe network system 120 and dispersed network devices, i.e., clients 124, that send or receive messages for specific groups of clients via publish/subscribe network system 120. In some embodiments, publish/subscribe network system 120 may conform to the Java Messaging Service (JMS), which is a widely used publish/subscribe messaging service specification. A geographically dispersed network, such as network 6 from FIG. 1, may be configured to operate substantially similar to publish/subscribe network system 120. An analyzer 128 coupled to publish/subscribe network system 120 may implement techniques that allow a user to monitor and test publish/subscribe network system 120. At least a portion of analyzer 128 may operate substantially similar to network analyzer 10 from FIG. 1.

Publish/subscribe network system 120 comprises a directory service 122 and one or more messaging service providers 126 coupled to clients 124. Directory service 122 includes a number of topic factories 123. As illustrated in FIG. 13, each of messaging service providers 126 registers with directory service 122, and installs a corresponding one of topic factories 123 within directory service 122. In the embodiment illustrated in FIG. 13, publish/subscribe network system 120 includes a single central server, i.e., directory service 122. In other embodiments, publish/subscribe network system 120 may include a plurality of distributed servers that use point-to-point networking for publish/subscribe messaging services.

Each of messaging service providers 126 maintains information that relates to a number of "topics." For example, each of messaging service providers 126 may store information published by one or more of clients 124 to a plurality of topics. Each of messaging service providers 126 may then broadcast information published to a specific topic to each of clients 124 that have subscribed to that specific topic. Clients 124 that subscribe to a specific topic may be identified via a username and password, a digital signature, digital certificate, or other digital credential. Identification is required for both access to topics and establishment of connections to messaging service providers 126.

To publish or subscribe to a topic, one of clients 124 requests a connection to one of message service providers 126 and a desired topic from directory service 122. Upon receiving the request from the one of clients 124, directory service 122 invokes an appropriate one of topic factories 123 that corresponds to the one of messaging service providers 126 that services the requested topic. For example, directory service 122 may invoke a specific one of topic factories 123 upon receiving a request for a topic maintained by the corresponding one of messaging service providers 126.

Analyzer 128 controls one or more agents 125 coupled to publish/subscribe network system 120 for monitoring and capturing data objects in both the application layer and the network layer of publish/subscribe network system 120. Agents 125 may be substantially similar to agents 4 from FIG. 1. For example, analyzer 128 may issue commands to initiate and terminate testing scenario performance and data capture by agents 125. Upon completing the scenario and capture, agents 125 communicate the results to analyzer 128, which analyzes the results and displays the analyzed results to the user.

Analyzer 128 may implement the techniques described herein to allow data object capture in the application layer of publish/subscribe network system 120 using shim adapters within agents 125 and subsequent analysis. Analyzer 128 may also implement the techniques to allow data object capture in the network layer of publish/subscribe network system 120 using agents 125 and subsequent analysis. Furthermore, analyzer 128 may perform integrated analysis of testing results from agents 125 for the application layer and the network layer to determine performance characteristics, such as latency, across both of the layers. In this way, the techniques described herein enable analyzer 128 to provide more accurate measurements of performance characteristics in publish/subscribe network system 120.

Figure 14:
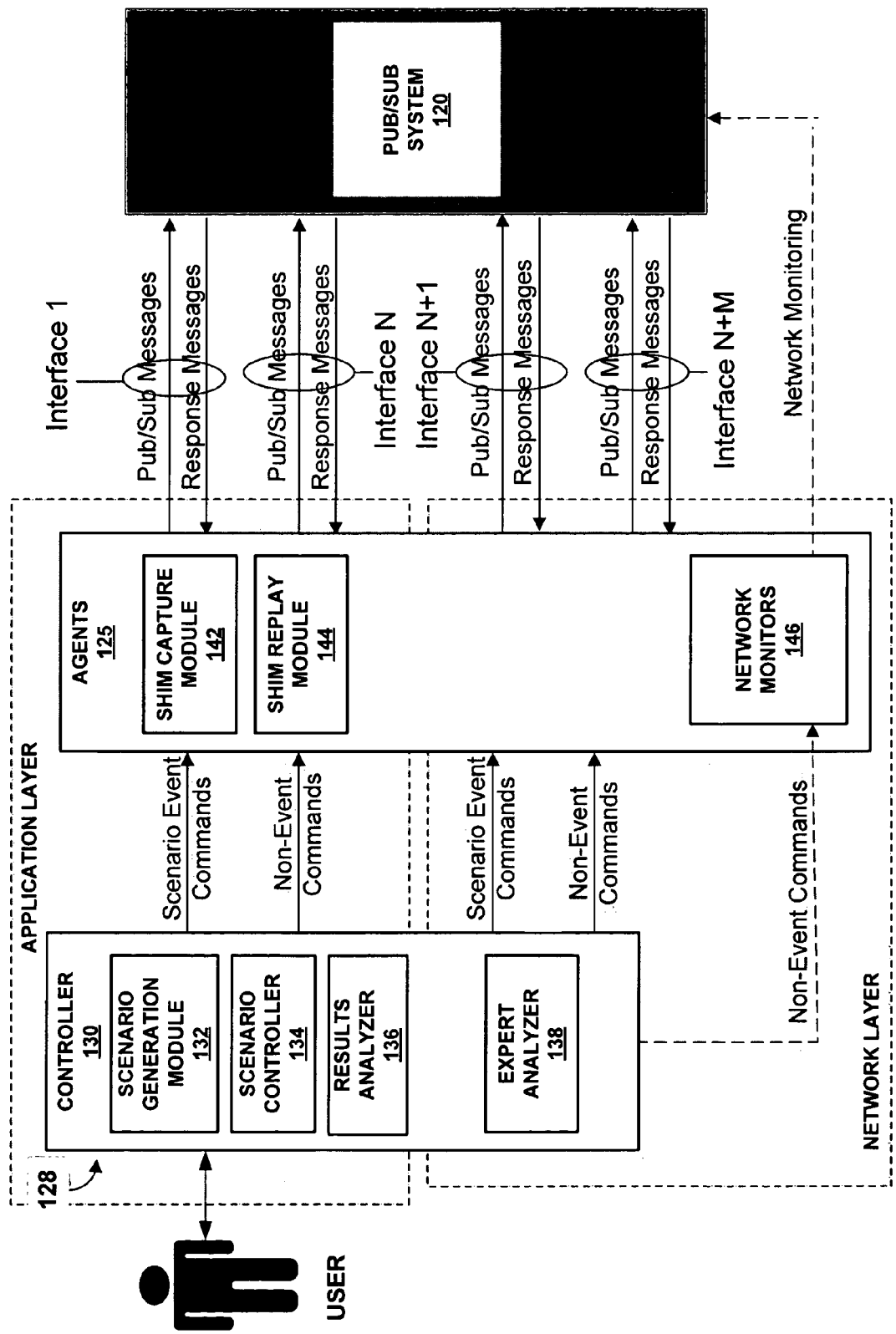
FIG. 14 is a block diagram illustrating agents and an analyzer coupled to a publish/subscribe network system in greater detail.

FIG. 14 is a block diagram illustrating agents 125 and analyzer 128 coupled to publish/subscribe network system 120 in greater detail. As described above, analyzer 128 supports an integrated testing approach that enables capturing of data objects in the application layer as well as the network layer of publish/subscribe network system 120 for finegrained performance analysis. The integrated testing approach allows a user to monitor publish/subscribe network system 120 both under development and in operation. In the illustrated embodiment, analyzer 128 has been implemented by means of a core system based on the application layer monitoring that is further enhanced with the network layer monitoring to form the integrated testing approach.

The techniques described herein integrates two techniques in testing the performance of publish/subscribe network system 120, i.e., the "active encapsulation" approach and the "network capture" approach. The active encapsulation approach consists of monitoring and capturing data objects in both the publish-side and subscribe-side application layers of clients 124 (i.e., within the application layer of the OSI model of the network stack). The network capture approach consists of monitoring and capturing data objects in both the publish-side and subscribe-side network layers of clients 124 (i.e., within the network layer of the network stack).

Analyzer 128 includes a controller 130 that controls testing setup via user input and analysis of the testing results. Controller 130 communicates with multiple agents 125 running both locally and remotely to simulate distributed clients 124 coupled to publish/subscribe network system 120. A shim adapter is interposed as a front door to each of clients 124 that communicate via publish/subscribe network system 120 during testing. The shim adapter serves as a software agent that monitors all the messages passing through the application layer of publish/subscribe network system 120 and captures performance data for analysis.

As shown in FIG. 14, controller 130 includes a scenario generation module 132 that generates test scenarios for publish/subscribe network system 120 based on input from the user. Controller 130 presents a unified Graphical User Interface (GUI) of scenario generation module 132 to the user for both the active encapsulation and the network capture monitoring and testing approaches. The GUI allows the user to control all the aspects of the test and evaluation process, including scenario component configuration, scenario creation, test case generation, test execution, performance data analysis, and publish/subscribe network system comparison. Through the GUI of scenario generation module 132 the user will be able to design various test scenarios that stress the performance of publish/subscribe network system 120. The created test scenarios may be stored in a scenario database for execution that is repeatable and portable.

Controller 130 also includes a scenario controller 134 that issues commands to agents 125 to initiate a selected test scenario for publish/subscribe network system 120. Scenario controller 134 is capable of launching and managing distributed test scenario executions on both local and remote agents 125. Scenario controller 134 then receives performance data captured by agents 125 during the test scenario and coordinates the storage of the captured performance data in a result database.

In addition, controller 130 includes a results analyzer 136 for analyzing data objects captured in the application layer of publish/subscribe network system 120, and an expert analyzer 138 for analyzing data objects captured in both the application layer and the network layer of publish/subscribe network system 120. Results analyzer 136 is capable of aggregating and analyzing the performance data captured in the application layer of publish/subscribe network system 120 after the selected test scenario is completed. Expert analyzer 138 supports the integrated analysis of data captured in both the application and network layers of publish/subscribe network system 120 by incorporating object-level decoding of the captured network packets. The decoding enables expert analyzer 138 to match data objects captured in the network layer with the data objects captured in the application layer to calculate performance characteristics, such as latency, for the data objects across both the application and the network layers of publish/subscribe network system 120.

Agents 125 connect sender and receiver clients 124 across publish/subscribe network system 120 via the shim adapter. Agents 125 also act as the communication vehicle connecting scenario controller 134 within controller 130 with the actual test execution mechanisms, such as simulated or real clients, shim adapters residing between client interfaces, and side channels between shim adapters and local test results storage. As shown in FIG. 14, each of agents 125 includes a shim capture module 142 and a shim replay module 144 for monitoring and capturing data objects in the application layer via shim adapters. Each of agents 125 also includes network monitors 146 for monitoring and capturing data objects in the network layer. A unified scenario execution module (not shown in FIG. 14) for both the active encapsulation and the network capture approaches may also be included in each of agents 125.

Shim capture module 142 includes shim adapters that capture performance data from the application layer of publish/subscribe network system 120 and store the captured data objects in local results storage for forwarding to controller 130 for central results storage and analysis. Shim replay module 144 is capable of simulating some of the events captured by shim capture module 142. Shim replay module 144 receives captured data objects and reads the contained event, which was captured previously by shim capture module 142 during a scenario. In the replay process, shim replay module 144 replicates the same calls in the same sequence as in the captured event to simulate the original scenario. Shim replay module 144 may be especially useful when a scenario needs to be repeatedly tested and the scenario can only be generated by a third party client over which the user might not have total execution control, or when repeated execution of the client is not desirable. Shim capture module 142 only needs to capture the scenario once when the client is actually running. Shim replay module 144 would then be able to take the captured data and replicate the scenario within the application layer of publish/subscribe network system 120.

Network monitors 146 may provide additional functionality such as real-time monitoring and fine-grained performance evaluation integrating network captures. Network monitors 146 may be launched by one of agents 125 to capture data objects in the network level of publish/subscribe network system 120. The captured data will be initially stored in a local database before being transferred to expert analyzer 138 in controller 130 for analysis.

In the case of the active encapsulation approach, scenario generation module 132 generates one or more test scenarios based on input from the user, and scenario controller 134 issues commands to agents 125 to initiate a selected one of the test scenarios. Shim adapters (not shown in FIG. 14) are inserted between the publish-side client application and the publish-side publish/subscribe API, and between the subscribe-side client application and the subscribe-side publish/subscribe API in each of clients 124. The shim adapters wrap a monitoring shell around publish/subscribe software. Controller 130 accomplishes performance testing of the application layer of publish/subscribe network system 120 through controlled simulation of clients 124 using the shim adapters according to the selected test scenario.

The shim adapters record timestamps on data objects that pass through the shim adapters. Shim capture module 142 then captures the data objects, including the recorded timestamps, that pass through the shim adapters according to the selected test scenario. In addition, scenario replays may be performed via shim replay module 144, which receives previously captured data objects as input and regenerates the same publish/subscribe conversation represented in by captured data objects. Agents 125 then send the shim results, i.e., captured data objects, of the selected test scenario to results analyzer 136. Results analyzer 136 analyzes the results and calculates performance characteristics of publish/subscribe network system 120. For example, results analyzer 136 may calculate latency within the application layer of publish/subscriber network system 120 based on the timestamps recorded in the captured data objects for the selected test scenario.

In the case of the network capture approach, controller 130 issues commands to launch network monitors 146 within each of agents 125 associated with the selected test scenario. Network monitors 146 record timestamps on data objects representing conversations between publish/subscribe network system 120 and clients 124 in the network layer. Network monitors 146 also capture the data objects, included the timestamps, that pass between publish/subscribe network system 120 and clients 124 within the network layer according to the selected test scenario. Agents 125 then send network results, i.e., captured network packets, from network monitor 146 as well as the shim results from the shim adapters to expert analyzer 138. Expert analyzer 138 aggregates and decodes the captured network packets in order to match the data objects from the network layer with the data objects from the application layer. Expert analyzer 138 then analyzes the matched data objects.

Controller 130 accomplishes integrated performance testing with expert analyzer 138 through a combined analysis of the network layer decoded results and the shim results of the selected testing scenario. In this way, expert analyzer 138 provides the user with accurate performance characteristics of publish/subscribe network system 120 covering the network layer as well as the application layer. For example, expert analyzer 138 may calculate latency within both the application layer and the network layer of publish/subscriber network system 120 based on the timestamps recorded in the captured data objects for the selected test scenario.

Figure 15:
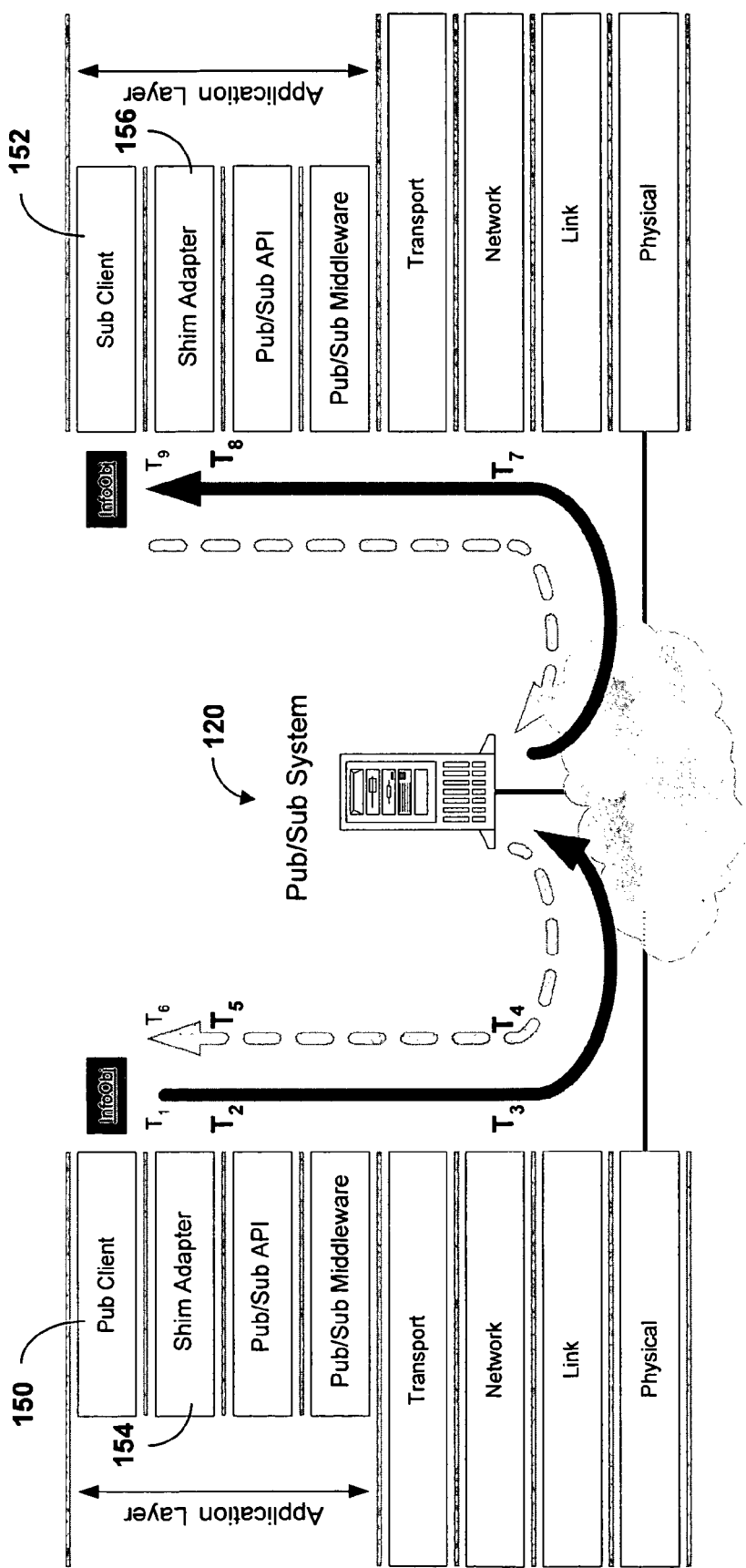
FIG. 15 illustrates transmission of data between a publish-side client application and a subscribe-side client application within a publish/subscribe network system.

FIG. 15 illustrates transmission of data between a publish-side client application 150 and a subscribe-side client application 152 within publish/subscribe network system 120. In accordance with embodiments of the invention, shim adapter 154 is inserted within the publish-side application layer between publish-side client application 150 and the publish-side publish/subscribe API. Furthermore, shim adapter 156 is inserted within the subscribe-side application layer between subscribe-side client application 152 and the subscribe-side publish/subscribe API.

As shown in FIG. 15, publish-side client application 150 and subscribe-side client application 152 include multiple software class layers, including the application layer and the network layer. At the bottom of the application layers are the publish/subscribe middleware layers, e.g. JMS network technology, which extend beyond the physical network and device space to facilitate service availability and the interactive behavior of those services across publish/subscribe network system 120. The publish/subscribe middleware layers would normally be transparent to publishing and subscribing applications through the enterprise publish/subscribe APIs to application developers. The inserted shim adapters 154, 156 present the same APIs as the publish/subscribe APIs to the client application. In this way, shim adapters 154, 156 mimic publish/subscribe network system 120 from the point of view of the sending and receiving client applications. Shim adapters 154, 156 essentially are wrappers around the publish/subscribe APIs and invoke their APIs on behalf of the client application. Therefore, from the point of view of publish/subscribe network system 120, shim adapters 154, 156 mimic the sending and receiving client applications.

In some cases, publish/subscribe network system 120 presents a Common Core Services API (CAPI) interface to the client applications 150, 152, and the client applications 150, 152 present a CAPI-compliant interface to publish/subscribe network system 120. Shim adapters 154, 156 also present a CAPI-compliant interface to the client applications 150, 152 and a CAPI-compliant interface to publish/subscribe network system 120.

When messages are transmitted between publish-side client application 150 or subscribe-side client application 152 and publish/subscribe network system 120 the messages pass through both the application layer and the network layer. Messages transmitted from publish-side client application 150 to publish/subscribe network system 120 pass through shim adapter 154 in the application layer. Shim adapter 154 timestamps and captures the messages that pass through shim adapter 154. As shown in FIG. 15, shim adapter 154 records timestamp T1 when the message enters shim adapter 154 and records timestamp T2 when the message exits shim adapter 154. A network monitor timestamps and captures the messages that pass from publish-side client application 150 to publish/subscribe network system 120 in the network layer. As shown in FIG. 15, a network monitor records timestamp T3 when the message exits the network layer of publish-side client application 150.

In addition, a network monitor timestamps and captures the messages that pass from publish/subscribe network system 120 to subscribe-side client application 152 in the network layer. As shown in FIG. 15, a network monitor records timestamp T7 when the message enters the network layer of subscribe-side client application 152. Messages transmitted from publish/subscribe network system 120 to subscribe-side client application 152 pass through shim adapter 156 in the application layer. Shim adapter 156 timestamps and captures the messages that pass through shim adapter 156. As shown in FIG. 15, shim adapter 156 records timestamp T8 when the message enters shim adapter 156 and records timestamp T9 when the message exits shim adapter 156. Similar timestamps are recorded on messages transmitted in the opposite direction from subscribe-side client application 152 to publish-side client application 150 via publish/subscribe network system 120.

The timestamps recorded on data objects captured in the application layer by a shim adapter and on data objects captured in the network layer by a network monitor enable expert analyzer 138 within controller 130 (FIG. 14) to provide a fine-grained performance analysis of publish/subscribe network system 120. The timestamps provide a fine breakdown in the components of response time in which expert analyzer 138 can sample response time in both directions and for each leg of the trip between publish-side client application 150 and subscribe-side client application 152. As a result, the user can isolate performance bottlenecks as being related to software layers versus network layers and determine where to focus performance improvement efforts.

Figure 16:
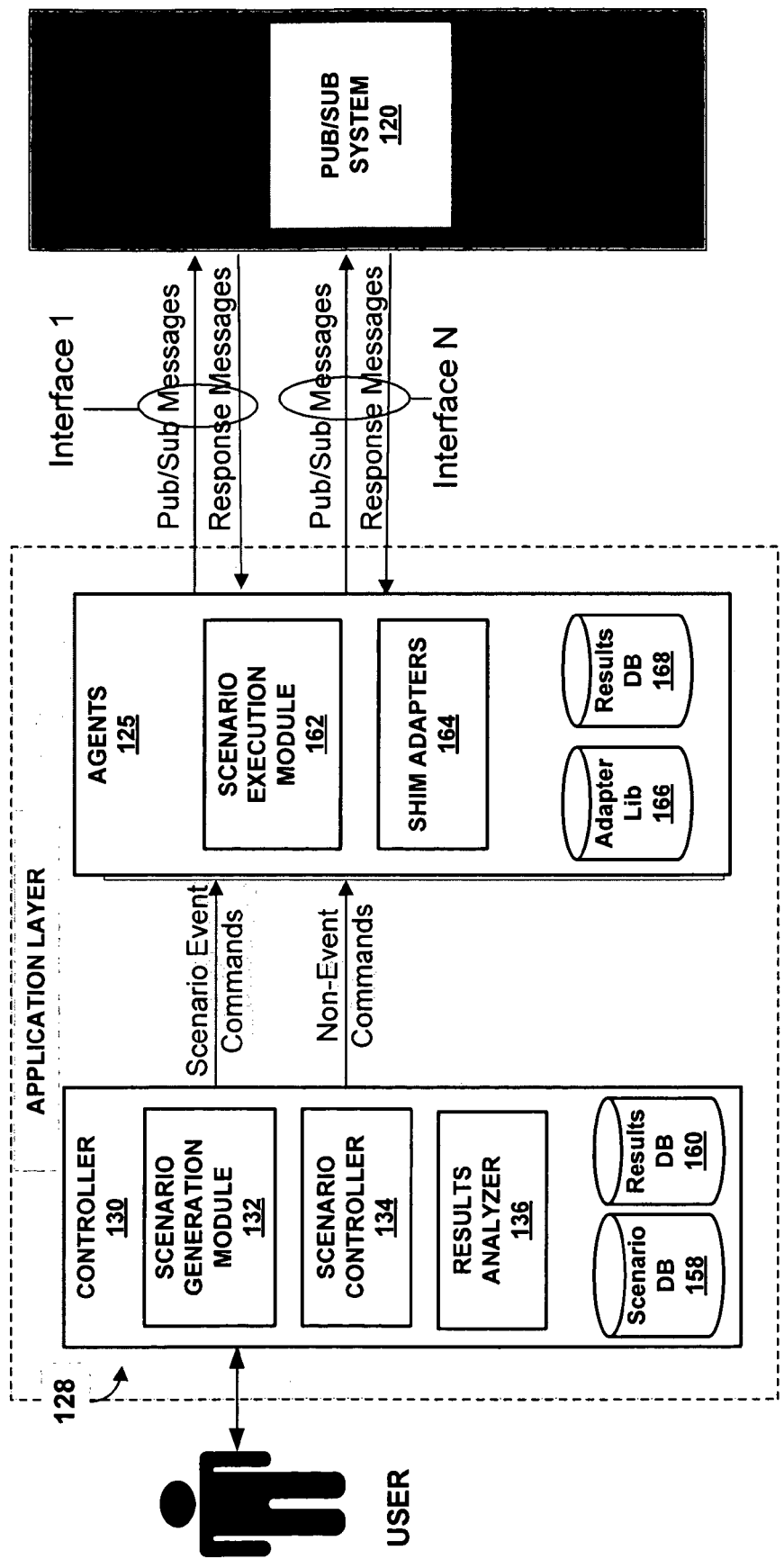
FIG. 16 is a block diagram illustrating an exemplary embodiment of an analyzer testing performance in the application layer of a publish/subscribe network system via the active encapsulation approach.

FIG. 16 is a block diagram illustrating an exemplary embodiment of analyzer 128 testing performance in the application layer of publish/subscribe network system 120 via the active encapsulation approach. The active encapsulation approach provides capabilities for evaluating publish/subscribe network system 120 either under development or deployed when the user has adequate control of the system implementation details. As illustrated in FIG. 16, analyzer 128 comprises controller 130 that includes scenario generation module 132, scenario controller 134, results analyzer 136, scenario database 158 and results database 160. Each of agents 140 includes a scenario execution module 162, a plurality of shim adapters 164, adapter library 166 and a local results database 168.

Scenario generation module 132 within controller 130 performs the test scenario management role. Scenario generation module 132 allows the user to create test scenarios in terms of application type, system characteristics, configurable communication interface definition, and testing parameters. Scenario generation module 132 then stores the created scenarios in scenario database 158 for execution that is repeatable and portable. Scenario controller is capable of launching test scenario executions both locally and remotely via agents 150 and managing such test executions. After executing a selected test scenario, scenario controller 134 receives captured performance data from agents 150 and coordinates the storage of the captured performance data in result database 160. Results analyzer 136 then analyzes the scenario test results and presents the analyzed results to the user.

Scenario execution module 162 within each of agents 125 performs functions such as local client simulation management on behalf of scenario controller 134, local storage of test scenario results in local results database 168, and forwarding of test scenario results to central results database 158 within controller 130 based on instructions from scenario controller 134. Scenario execution module 162 primarily mediates and controls the execution of scenario tests in response to commands received from scenario controller 134. Scenario execution module 162 manages the streaming of the test scenario data, as well as the simulation of publish/subscribe clients via shim adapters 164.

In some cases, scenario execution module 162 may run constantly within each of agents 125 listening for and responding to instructions from scenario controller 134. In response to scenario controller 134, scenario execution module 162 instantiates a targeted publish/subscribe network system, such as publish/subscribe network system 120, to be tested. In addition, scenario execution module 162 composes and launches the proper test clients, ensuring that the appropriate shim adapters 164 are inserted within the clients using objects stored in shim adapter library 166. The clients may be created artificially using shim adapters 162 for simulation purposes, or may be ready made by application developers with shim adapters 164 properly inserted. Multiple clients may be instantiated by scenario execution module 162 either as separate processes or separate threads in a single process or a hybrid. The simulated test clients may be augmented or extended through scenario execution module 162, thus allowing for a variety of test scenarios.

Besides local publish/subscribe client management, scenario execution module 162 is also responsible for local storage of test scenario results in local results database 168, and forwarding of the test scenario results to central results database 160 within controller 130 in response to instructions from scenario controller 134. The streaming of test scenario results to central test database 160 takes place after the selected test scenario is complete so the performance measurements will not be skewed by the non-essential network traffic of transmitting the results between agents 125 and controller 130.

Shim adapters 164 simulate publish/subscribe clients coupled to publish/subscribe network system 120 according to a selected test scenario. Shim adapters 164 record timestamps on data objects passing through shim adapters 164 and capture the data objects including the timestamps, which are the basis for higher order analysis. Each of agents 125 supports multiple shim adapters 164 and multiple simulated client instances created on a single processor. Adapter library 166 serves as a software repository for shim adapters 164. Local results database 168 provides a temporary storage for performance data captured by shim adapters 164 before forwarding to central results database 160 within controller 130 for processing. In this way, real-time network traffic may be reduced during the testing period when simulated publish/subscribe clients are running. This enables a "cleaner" test of publish/subscribe network system 120, and reduces the processing load on shim adapters 164, since shim adapters 164 are only required to capture the performance data and dump the performance data to local results database 168.

In the active encapsulation approach, shim adapters 162 are interposed as front doors to each software entity that communicates via publish/subscribe network system 120 when under a test scenario. Shim adapters 164 are implemented as proxy agents that are inserted between the client interface to publish/subscribe network system 120 and publish/subscribe adapters. As described above in reference to FIG. 15, shim adapters collaborate in pairs, with one residing on the sending-client side and the other residing on the receiving-client side. Shim adapters 164 act in the role of "software wiretap agents" to collect performance data on the data objects passing through them. From the point of view of publish/subscribe network system 120, the collaborating shim adapters 164 mimic the sending and receiving clients 124, and from the point of view of the sending and receiving clients 124, the collaborating shim adapters 164 mimic publish/subscribe network system.

As a data-publish message is sent from a sending client to a receiving client, the message passes through shim adapters 164 on the sending and receiving ends, which gather timestamps that can later be differenced to obtain message transit time performance data. Shim adapters 164 may present a conforming API interface to their respective client applications and mimic the behavior of the clients to publish/subscribe network system 120. Shim adapters 164 forward unmodified message traffic to counterpart shim adapters 164 at the other end of the conversation while simultaneously timestamping and capturing all data objects that passes through shim adapters 164. Results analyzer 136 matches timestamps recorded on the captured data objects to allowing metering of transit times across publish/subscribe network system 120. Results analyzer 136 may analyze publish/subscribe network system throughput as well as response time performance either on a detailed per-conversation basis, or else aggregated across network paths or subsystems.

The active encapsulation approach for testing performance of publish/subscribe network 120 works regardless of whether the physical connection between clients 124 is network-based or in-processor via inter-process communication or local host TCP/IP sockets. Since each of shim adapters 164 is a proxy agent, the actual native network transport method underlying the architecture of publish/subscribe network system 120 is used unmodified on the data channel between the proxy agents. In addition, there is no restriction on the type of publish/subscribe architecture that can be tested or the type of machine or operating system upon which it is deployed.

However, the introduction of a proxy pair of shim adapters 164 into each of clients 124 introduces an additional propagation delay in the traffic path through publish/subscribe network system 120. Shim adapters 164 must be lightweight so as to minimize impact on the performance of publish/subscribe network system 120. The performance data captured by the shim adapters 164 may be used to estimate the added delay and then subtract the delay from the observed transit times to obtain accurate estimates of performance without the proxy agents. The impact any shim adapter latency could have on the results of an evaluation of publish/subscribe network system 120 would most likely be from the effects on the rate of publication. The latencies caused by publish-side shim adapters are typically below approximately 3% over a range of payload sizes.

Figure 17:
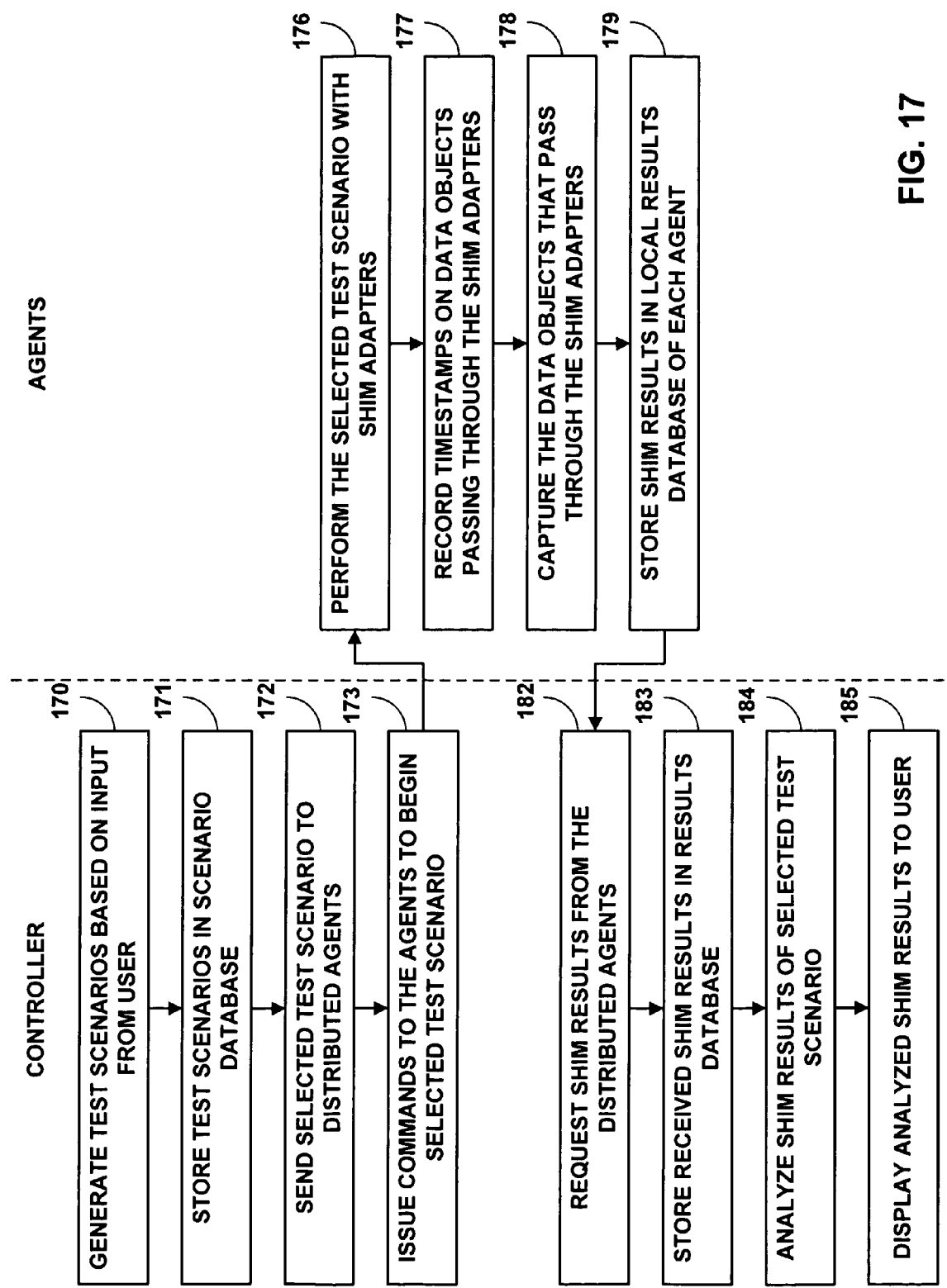
FIG. 17 is a flowchart illustrating an exemplary operation of testing performance of a publish/subscribe network system in the application layer using the active encapsulation approach.

FIG. 17 is a flowchart illustrating an exemplary operation of testing performance of a publish/subscribe network system in the application layer using the active encapsulation approach. The operation will be described herein in reference to controller 130 within analyzer 128 and agents 125 coupled to publish/subscribe network system 120 from FIG. 16.

Scenario generation module 132 within controller 130 generates test scenarios for publish/subscribe network system 120 based on input from a user (170). Scenario generation module 132 stores the test scenarios in scenario database 158 (171). Scenario controller 134 may then select one of the generated test scenarios stored in scenario database 158 to test performance of publish/subscribe network system 120. Scenario controller 134 sends the selected test scenario to distributed agents 125 (172). In some cases, only those distributed agents 125 associated with the selected test scenario will accept the test scenario from scenario controller 134. Once the associated agents 125 receive the selected test scenario, scenario controller 134 issues commands to agents 125 to initiate the selected test scenario on publish/subscribe network system 120 (173).

Scenario execution module 162 within each of agents 125 initiates shim adapters 164 according to the selected test scenario in response to the commands from scenario controller 134. Shim adapters 164 simulate clients coupled to publish/subscribe network 120 to perform the selected test scenario (176). Shim adapters 164 record timestamps on data objects that pass through shim adapters 164 between the simulated publish-side or subscribe-side clients and publish/subscribe network system 120 (177). As described above, shim adapters 164 may record timestamps both when messages enter shim adapters 164 and when the messages exit shim adapters 164. In addition, shim adapters 164 capture the data objects, including the timestamps, passing through shim adapters 164 (178). Shim adapters 164 then store the shim results, i.e., captured data objects and timestamps, of the selected test scenario in local results database 168 (179).

Upon completion of the selected test scenario, scenario controller 134 requests the shim results from distributed agents 125 (182). Scenario controller 134 receives the shim results from each of agents 125 and stores the received shim results in central results database 160 (183). Results analyzer 136 then analyzes the shim results of the selected test scenario to determine performance characteristics, such as latency, in the application layer of publish/subscribe network system 120 (184). Finally, results analyzer 136 displays the analyzed shim results of the selected test scenario to the user (185). In this way, the user may anticipate performance of publish/subscribe network system 120 in specific situations and adjust characteristics of publish/subscribe network system 120 accordingly.

Figure 18:
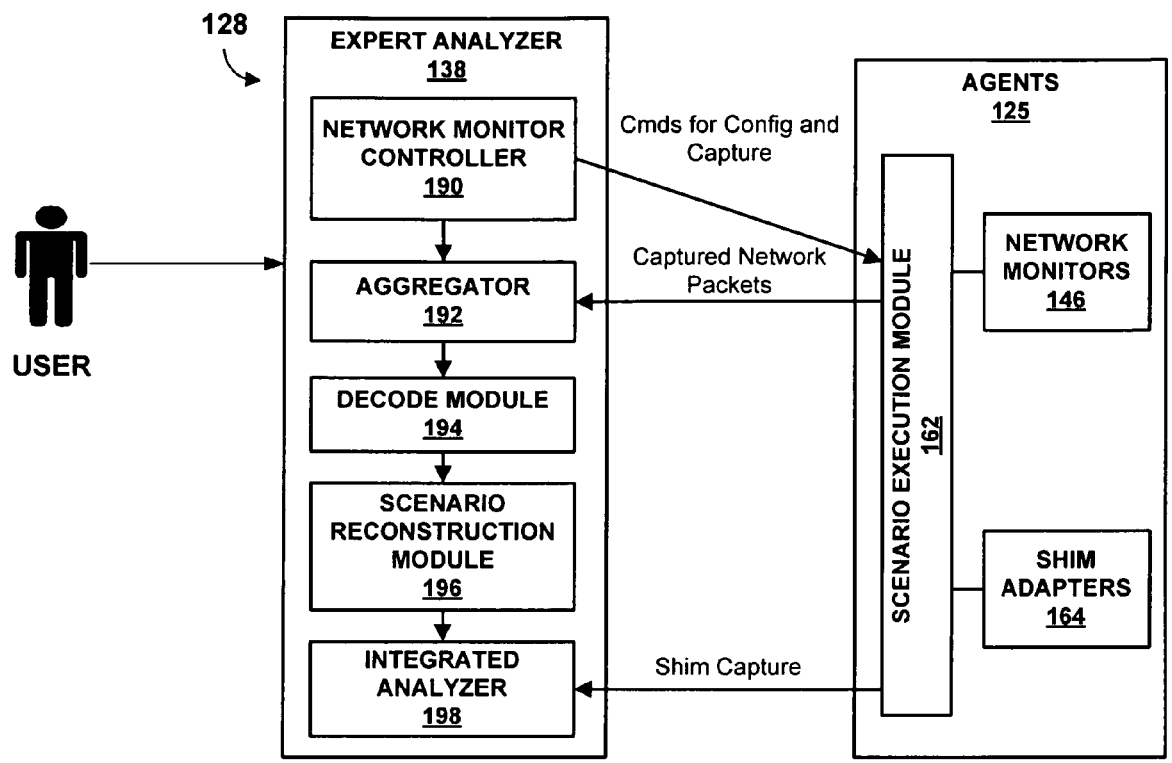
FIG. 18 is a block diagram illustrating an exemplary embodiment of an analyzer testing performance in the network layer of a publish/subscribe network system via the network capture approach.

FIG. 18 is a block diagram illustrating an exemplary embodiment of analyzer 128 testing performance in the network layer of publish/subscribe network 120 via the network capture approach. The network capture approach provides capabilities for real-time monitoring of publish/subscribe network system 120 either under development or deployed, even without adequate control of the system implementation details. In addition to the components within analyzer 128 and agents 125 described above for the active encapsulation approach, agents 125 include network monitors 146, and analyzer 128 includes expert analyzer 138 within controller 130 to perform decode and integrated analysis of results of a selected test scenario in both the application layer and the network layer.

Network monitors 146 within each of agents 125 provide the capability of capturing data object propagation from a publish-side client to a subscribe-side client at the network level. The data objects captured by network monitors 146 provide a more detailed picture on when a data object leaves the network interface on one client and when the data object arrives at the other client. Expert analyzer 138 includes a network monitor controller 190 to initiate timestamping and packet capture by network monitors 146 during a selected test scenario. Expert analyzer 138 also includes an aggregator 192, a decode module 194, a scenario reconstruction module 196, and an integrated analyzer 198 to match test scenario results from both the application layer and the network layer and perform integrated analysis of the results.

In some cases, network monitor controller 190 may issue commands to scenario execution module 162 within each of agents 125 to launch network monitors 146 during execution of a selected test scenario. Network monitors 146 record timestamps and capture data objects propagating in the network layer. The network results, i.e., captured data objects and timestamps, are then sent to expert analyzer 138 to be aggregated by aggregator 192 and decoded by decode module 194 to extract relevant information, such as timing information, to be combined with the shim results stored in central results database 160 within controller 130. Decode module 194 may be used to decode captured network packets conforming to the remote method invocation (RMI) message protocol. Integrated analyzer 198 then analyzes the combined shim results and network results to determine performance of publish/subscribe network system 120 over both the application layer and the network layer.

Expert analyzer 138 provides the capability to perform an integrated analysis of the shim results and the network results. For example, network monitor controller 190 controls and configures network monitors 146 distributed across publish/subscribe network system 120, which capture data objects in the network layer representing conversations between publish/subscribe clients. Aggregator 192 retrieves and aggregates the captured network results from local results database 168 within each of agents 125. Decode module 194 controls the RMI decode of network conversations captured between clients 124 and publish/subscribe network system 120 by network monitors 146. Scenario reconstruction module 196 partially reconstructs the selected test scenario from the captured network packets. Finally, integrated analyzer 198 integrates the decoded network results with the shim results from shim adapters 164 and analyzes the combined results for detailed performance evaluation of publish/subscribe network system 120.

Network monitor controller 190 within expert analyzer 138 enables the user to control network monitors 146 in each of agents 125 that are distributed strategically across publish/subscribe network system 120. Network monitors 146 may be configured by network monitor controller 190 to carry out Ethernet network monitoring and frame capture. As shown in FIG. 18, network monitor controller 190 communicates with network monitors 146 through scenario execution module 162, which is a kind of daemon process in agents 125 serving as the single point of contact for communications between analyzer 128 and agents 125. Network monitor controller 190 may retrieve certain configuration information from the remote network monitors 146, such as the number of resident network interface cards (NICs), MAC and IP address of each card, to enable the user determine remotely which NIC to use for network packet capture.

In response to commands from network monitor controller 190, network monitors 146 monitor the network traffic in the intranet/internet environment where publish/subscribe network system 120 is operating according to a selected test scenario. Network monitors 146 timestamp and capture real-time interactions between clients 124 and publish/subscribe network system 120 in the network layer. The network results, i.e., captured data objects including timestamps, are initially stored as part of local results database 168. The network results are then sent to aggregator 192 in response to a request from network monitor controller 190. Aggregation enables integrated analyzer 198 to identify duplicate packets that may exist in the network results. The network results are then decoded by decode module 194 and a partial scenario reconstruction is performed based on the decoded results by scenario reconstruction module 196. Integrated analyzer 198 then analyzes the shim results from shim adapters 164 and the aggregated and decoded network results to determine performance characteristics over both the application layer and the network layer of publish/subscribe network system 120.

The network capture approach alone requires at least partial completion of publish/subscribe network system for network monitors 146 to capture interactions between clients 124. The network capture approach may be used with the active encapsulation approach, described above, in which clients 124 are mimicked by shim adapters 164 to performance test publish/subscribe network system 120 under development. This hybrid approach may be particularly useful during the development of publish/subscribe network system 120 as there are no real clients 124 to generate the necessary network conversations for network monitors 146 to capture.

The network capture approach also requires that interactions between clients 124 and publish/subscribe network system 120 take place across the network layer that is being monitored. Although clients 124 would typically operate in a distributed fashion in a real application, this would preclude the testing of a scenario where clients 124 are running on the same processor as publish/subscribe network system 120. Additionally, the network capture approach requires that conversations between clients 124 not be encrypted so that it is possible to decode and replay the captured network packets. In other embodiments, expert analyzer 138 may include decrypt and encrypt functions and replay agents to support encrypted information flows.

The decode analysis and partial scenario construction provides a more detailed picture on when a data object leaves the network interface on a publish-side client after traveling down from the application layer and when the data object arrives at a subscribe-side client before it travels up the stacks to the application layer. The timestamps extracted from the shim results and the network results provide a fine breakdown in the components of response time. As a result, the user may isolate performance bottlenecks as being related to various interface-related software layers versus network layers. The user could then make characteristic adjustments to improve the performance of publish/subscribe network system 120.

The case in which decode module 194 decodes RMI protocol messages will now be described in greater detail. Decoding a message protocol requires an exact knowledge of the network level format of each message. Most messaging protocols have at least two types of messages: outgoing and incoming messages. These two may be supplemented by a variety of other message types such as status messages. For almost all purposes these extra messages are not useful while testing a system. The main focus of any messaging protocol decode is therefore the outgoing (request) and incoming (reply) messages.

Each message contains a basic header followed by the data that the message is carrying as its payload. Since this payload can vary substantially due to differing method parameters decoding, the payload almost always requires a reasonable amount of flexibility. The easiest protocols to decode have information in each message detailing the contents of the payload. Other protocols do not have this information. RMI is one such protocol that requires other means of identifying the contents of the payload, and usually contains a hint as to the method called in the header.

Once the correct method being called has been identified, the payload of the incoming message must be determined. If the contents are explicitly stated then the problem is solved. However, usually another method is necessary to determine the incoming payload. In some cases, there may be a message identifier that allows matching an outgoing and an incoming message. In other cases, the only hints are that the messages were sent over the same communication channel and happened sequentially. A matching algorithm is necessary to successfully decode these incoming messages.

Once the method of a message request/reply pair has been determined the class of the object whose method was called still needs to be determined. The method signatures almost never contain the type information. Most messaging protocols rely on a central registration service with which all servers register. When registering, the servers give the registration service a name and an object reference. A client can then query the name and receive the object reference back. Since most messages do not contain any type information and registration service interfaces are well defined, it is necessary to watch the registration service interaction of clients to associate object references with object types. Once a client has received an object reference, the client only uses the object reference and it is up to decode module 194 to determine the correct type and method to decode the payloads.

The RMI protocol is based on streams. Each client makes a number of TCP connections with a server and sends requests to the server. The outgoing stream has the letters "JRMI" as the first four bytes making it easy to determine which packets contain RMI messages. Each outgoing message is marked with an object id consisting of four numbers as well as a hash or an index determining the method called.

In RMI, each request requires a response. There is no other link between an outgoing message and an incoming message. This results in the necessity of a heuristic matching algorithm. Decode module 194 actually keeps a table of queues. Each entry in the table corresponds to one TCP connection. For each outgoing message, an entry is added to the queue containing the object type and method information. In expert analyzer 138, all network packets are organized into data streams by concatenating all TCP data into one large array for each IP-port conversation. For each interaction between a client and a server, there are two data streams: from client to server, and from server to client. Decode module 194 first attempts to decode a message from the client-to-server stream (outgoing messages) and then switches streams to decode the corresponding incoming message. Since the streams order the packets rigidly and no messages are decoded more than once this matching algorithm works consistently well in matching up outgoing and incoming messages.

RMI provides an RMI registry server. This is a basic server that connects names to object references. Since the RMI registry server is just another standard Java RMI object, no special code has to be added to decode the messages. The only requirement is to recognize the unique object identifiers used for the registry and using the reply payloads to set up object reference to object type bindings. This makes the name-service tracking simple and provides the type information required to decode messages for an object id.

RMI has two different fields used for identifying the method called. Which field gets used is based on the version of RMI being used. Older versions of RMI use an index into an array to identify the method. This array is created at compile time from the server classes and is not meant to be directly accessed by users. New version of RMI uses a hash value. The hash value is obtained by sending a method signature through a cryptographic digest algorithm which allows RMI to uniquely identify a method signature without requiring a large amount of space in the message header.

When an RMI object is compiled it is necessary to also run the rmic (RMI compiler) on the corresponding Java files. This produces a stub and a skeleton file. Later versions of RMI do not produce skeleton files. The stub file contains a class designed to send the network messages to a server when the class methods are called. This class is actually sent over the network when a remote reference is needed. The skeleton is the receiving end of this communication. Later versions of RMI use a generic skeleton file while early versions use explicit files. These skeleton files also contain the array of operations used to determine the correct method a message is calling. Decode module 194 will manually create a skeleton object for the correct data type and retrieve that array when the older method is used to specify the method called.

For the newer RMI versions it is necessary to compute correct hash values for each method of a class and compare those values with the requested hash value. Since the process to produce is badly specified it was determined to use the facility in JBoss to retrieve the correct method for the decode. This results in correct retrieval of the method given the hash without requiring massive amounts of code that would need to be built without specifications available.

Once an outgoing message has been successfully linked to a Java data type and a method, the parameters are extracted from the data stream in the order the method specifies. The type and method information is then added to the correct stream queue. When an incoming message is to be decoded, decode module 194 queries the stream queue for the last type and method seen. According to that information, decode module 194 decodes the return payload into the structure.

In either case, decode module 194 then produces a string representation of the decoded data and stores this string. The newly created Java objects are then destroyed. This keeps the number or Java objects to a minimum while still allowing full display of all important data in expert analyzer 138.

Figure 19:
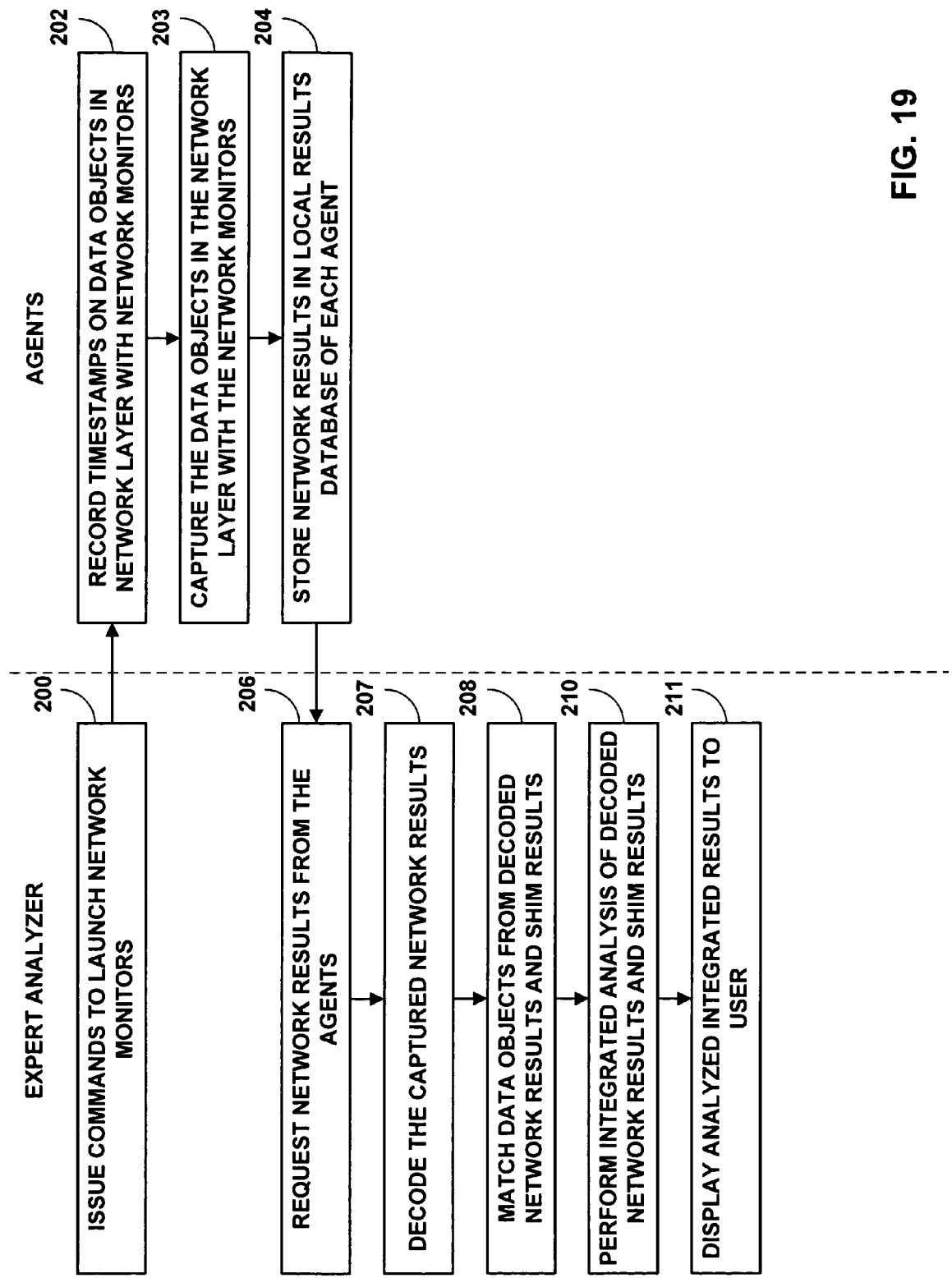
FIG. 19 is a flowchart illustrating an exemplary operation of testing performance of a publish/subscribe network system in the network layer using the network capture approach.

FIG. 19 is a flowchart illustrating an exemplary operation of testing performance of a publish/subscribe network system in the network layer using the network capture approach. The operation will be described herein in reference to expert analyzer 138 within controller 130 and agents 125 coupled to publish/subscribe network system 120 from FIG. 18.

Network monitor controller 190 within expert analyzer 138 issues commands to launch network monitors 146 within distributed agents 125 (200). Scenario execution module 162 launches network monitors 146 associated with the selected test scenario being executed on publish/subscribe network system 120. Network monitors 146 record timestamps on data objects propagating in the network layer between clients 124 and publish/subscribe network 120 (202). As described above in reference to FIG. 15, network monitors 146 record timestamps on a data object when the data object exits the network layer of a client to publish/subscribe network system 120, or when the data object enters the network layer of a client from publish/subscribe network system 120. In addition, network monitors 146 capture the data objects, including timestamps, propagating in the network layer (203). Network monitors 14 then store the network results, i.e., captured packets and timestamps, in a local results database 168 (204).

Network monitor controller 190 then requests the network results from agents 125 (206). Aggregator 192 receives the network results from agents 125 via scenario execution module 162. Decode module 194 decodes the aggregated network packets from aggregator 192 (207). In the case where the network packets conform to the RMI message protocol, decode module 194 may decode the network packets as described above. Integrated analyzer receives the decoded network results and the shim results stored in central results database 160 within controller 130. Integrated analyzer 198 then matches data objects within the decoded network results and the shim results (208). Integrated analyzer 198 performs an integrated analysis of the matched results to determine performance characteristics in both the application layer and the network layer of publish/subscribe network system 120 (210). Finally, integrated analyzer 198 displays the integrated results of the selected test scenario to the user (211). In this way, the user may anticipate performance of publish/subscribe network system 120 in specific situations and adjust characteristics of publish/subscribe network system 120 accordingly.

Figure 20:
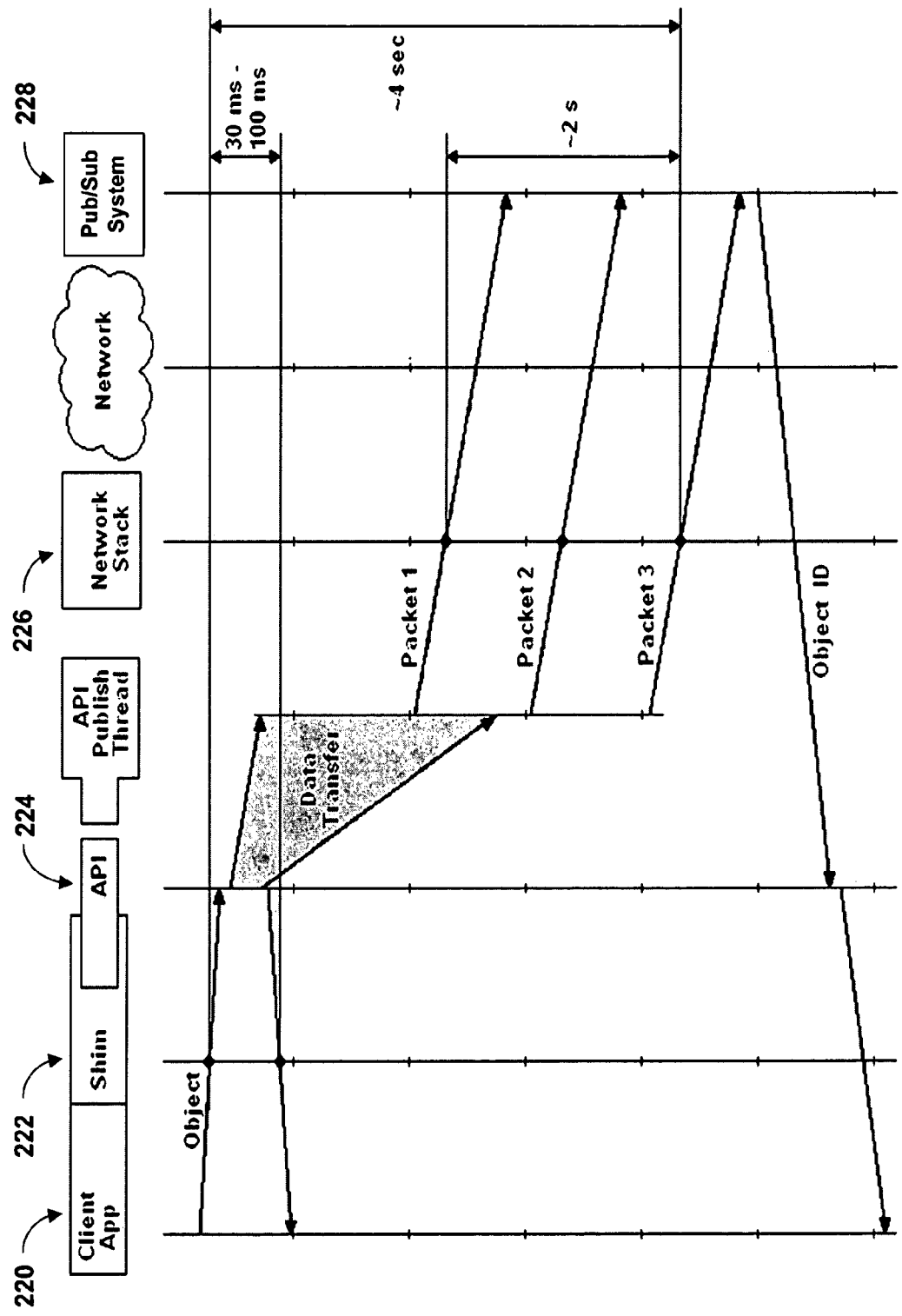
FIG. 20 illustrates a timing analysis of a publish/subscribe network system over both the application layer and the network layer generated by integrated analysis.

FIG. 20 illustrates a timing analysis of a publish/subscribe network system 228 over both the application layer and the network layer generated by integrated analysis. As shown in FIG. 20, the latency measurement within the application layer from a client 220 through shim adapter 222 to a publish/subscribe API 224 is between approximately 30 ms and 100 ms. In the case of the active encapsulation testing approach, a user would only see this latency measure over the application layer. However, the latency measurement over the entire path from client 220 to publish/subscribe network system 228 is substantially greater.

The latency measurement within the network layer from network stack 226 to publish/subscribe network system 228 may be approximately 2 seconds. By incorporating the network capture approach with the active encapsulation approach, the user may see the entire latency measurement over both the application layer and the network layer as approximately 4 seconds. In this way, the user may accurately anticipate timing performance of publish/subscribe network system 228 and adjust characteristics of publish/subscribe network system 228 to improve latency if needed.

Various embodiments of the invention have been described. These and other embodiments are within the scope of the following claims.

The invention claimed is:

1. A method implemented at least in part by a network analyzer for monitoring and testing a publish/subscribe network system, comprising:
generating a test scenario for the publish/subscribe network system;
issuing commands to a plurality of agents positioned at different locations within the publish/subscribe network system to initiate the test scenario;

capturing data objects propagating between publish/subscribe clients and the publish/subscribe network system according to the test scenario with the plurality of agents;

communicating results of the test scenario including the captured data objects to an analyzer coupled to the publish/subscribe network system;

analyzing the results of the test scenario to determine performance characteristics of the publish/subscribe network system;

selecting portions of the data objects captured during the test scenario for use as replay data; and simulating the publish/subscribe clients coupled to the publish/subscribe system to replicate portions of the test scenario on the publish/subscribe network system.

2. The method of claim 1, further comprising:
generating a plurality of test scenarios for the publish/subscribe network system; and storing the plurality of test scenarios in a test scenario database.

3. The method of claim 2, further comprising:
selecting a test scenario from the plurality of test scenarios stored in the test scenario database; and
communicating the selected test scenario to the plurality of agents coupled to the publish/subscribe network system.

4. The method of claim 1, further comprising recording timestamps on the data objects propagating between the publish/subscribe clients and the publish/subscribe network system according to the test scenario with the plurality of agents.

5. The method of claim 1, further comprising storing the results of the test scenario in a local results database within each of the plurality of agents.

6. The method of claim 1, further comprising receiving a request from the analyzer for the results of the test scenario after the test scenario is complete, and communicating the results of the test scenario from the agents to the analyzer in response to the request.

7. The method of claim 1, wherein each of the plurality of agents includes shim adapters inserted within the application layer of the publish/subscribe clients coupled to the publish/subscribe network system.

8. The method of claim 7, wherein capturing data objects comprises capturing data objects propagating through the shim adapters within the application layer of the publish/subscribe clients.

9. The method of claim 7, further comprising recording a first timestamp on a data object when the data object enters one of the shim adapters, and recording a second timestamp on the data object when the data object exits the one of the shim adapters.

10. The method of claim 7, further comprising simulating the publish/subscribe clients coupled to the publish/subscribe system with the shim adapters during the test scenario when the publish/subscribe system is under development.

11. The method of claim 7, wherein communicating results of the test scenario comprises communicating shim results from the network layer to the analyzer, and wherein analyzing the results of the test scenario comprise analyzing the shim results to determine performance characteristics of the publish/subscribe network system over the application layer.

12. The method of claim 1, wherein capturing data objects comprises capturing data objects propagating within the network layer of the publish/subscribe clients.

13. The method of claim 12, further comprising recording a timestamp on a data object when the data object passes through the network layer of one of the publish/subscribe clients.

14. The method of claim 12, wherein communicating results of the test scenario comprises communicating network results from the network layer to the analyzer, and wherein analyzing the results of the test scenario comprise aggregating captured network packets within the network results, decoding the aggregated network packets, and analyzing the decoded network results to determine performance characteristics of the publish/subscribe network system over the network layer.

15. The method of claim 14, wherein the captured network packets conform to the remote method invocation (RMI) message protocol, and wherein decoding the captured network packets comprises performing a RMI decode.

16. The method of claim 1, wherein capturing data objects comprises capturing data objects propagating within the application layer of the publish/subscribe clients with shim adapters, and capturing data objects propagating within the network layer of the publish/subscribe clients with network monitors.

17. The method of claim 16, wherein communicating results of the test scenario comprises communicating shim results from the application layer and network results from the network layer to an integrated analyzer.

18. The method of claim 17, wherein analyzing the results of the test scenario comprise:
decoding the network results;
matching data objects within the decoded network results to data objects within the shim results; and
analyzing the matched data objects to determine performance characteristics of the publish/subscribe network system over both the application layer and the network layer.

19. The method of claim 1, wherein the publish/subscribe system comprises one of a deployed publish/subscribe system or a developing publish/subscribe system.

20. A computer-readable medium comprising instructions that cause a programmable processor to:
generate a test scenario for a publish/subscribe network system;
issue commands to a plurality of agents positioned at different locations within the publish/subscribe network system to initiate the test scenario;
capture data objects propagating between publish/subscribe clients and the publish/subscribe network system according to the test scenario with the plurality of agents;
communicate results of the test scenario including the captured data objects to an analyzer coupled to the publish/subscribe network system;
analyze the results of the test scenario to determine performance characteristics of the publish/subscribe network system;
select portions of the data objects captured during the test scenario for use as replay data; and
simulate the publish/subscribe clients coupled to the publish/subscribe system to replicate portions of the test scenario on the publish/subscribe network system.

21. The computer-readable medium of claim 20, further comprising instructions that cause the programmable processor to record timestamps on the data objects propagating between the publish/subscribe clients and the publish/subscribe network system according to the test scenario with the plurality of agents.

22. The computer-readable medium of claim 20, wherein each of the plurality of agents includes shim adapters inserted within the application layer of the publish/subscribe clients coupled to the publish/subscribe network system, and wherein the instructions cause the programmable processor to capture data objects propagating through the shim adapters within the application layer of the publish/subscribe clients.

23. The computer-readable medium of claim 22, further comprising instructions that cause the programmable processor to record a first timestamp on a data object when the data object enters one of the shim adapters, and record a second timestamp on the data object when the data object exits the one of the shim adapters.

24. The computer-readable medium of claim 22, further comprising instructions that cause the programmable processor to simulate the publish/subscribe clients coupled to the publish/subscribe system with the shim adapters during the test scenario when the publish/subscribe system is under development.

25. The computer-readable medium of claim 20, wherein the instructions cause the programmable processor to capture data objects propagating within the network layer of the publish/subscribe clients.

26. The computer-readable medium of claim 20, further comprising instructions that cause the programmable processor to record a timestamp on a data object when the data object passes through the network layer of one of the publish/subscribe clients.

27. The computer-readable medium of claim 20, wherein the instructions cause the programmable processor to capture data objects propagating within the application layer of the publish/subscribe clients with shim adapters, and capture data objects propagating within the network layer of the publish/subscribe clients with network monitors.

28. The computer-readable medium of claim 27, wherein the instructions cause the programmable processor to communicate shim results from the application layer and network results from the network layer to an integrated analyzer.

29. The computer-readable medium of claim 28, wherein the instructions cause the programmable processor to:
   decode the network results;
   match data objects within the decoded network results to data objects within the shim results; and
   analyze the matched data objects to determine performance characteristics of the publish/subscribe network system over both the application layer and the network layer.

30. A system comprising:
   a publish/subscribe network system;
   publish/subscribe clients coupled to the publish/subscribe network system;
   a plurality of agents positioned at different locations within the publish/subscribe network system; and
   an analyzer coupled to the publish/subscribe network including a controller that generates a test scenario for the publish/subscribe network system and issues commands to the plurality of agents to initiate the test scenario,
   wherein the plurality of agents capture data objects propagating between the publish/subscribe clients and the publish/subscribe network system according to the test scenario, and communicate results of the test scenario including the captured data objects to the analyzer, wherein the analyzer analyzes the results of the test scenario to determine performance characteristics of the publish/subscribe network system, and
   wherein each of the plurality of agents includes a shim replay module that selects portions of the data objects captured during the test scenario for use as replay data, and simulates the publish/subscribe clients coupled to the publish/subscribe system to replicate portions of the test scenario on the publish/subscribe network system.

31. The system of claim 30, wherein the controller includes a scenario generation module that generates a plurality of test scenarios for the publish/subscribe network system, and test scenario database that stores the plurality of test scenarios.

32. The system of claim 30, wherein the controller includes a scenario controller that selects a test scenario from the plurality of test scenarios stored in the test scenario database, and communicates the selected test scenario to the plurality of agents coupled to the publish/subscribe network system.

33. The system of claim 30, wherein the plurality of agents record timestamps on the data objects propagating between the publish/subscribe clients and the publish/subscribe network system according to the test scenario.

34. The system of claim 30, wherein each of the plurality of agents includes a local results database that stores the results of the test scenario.

35. The system of claim 30, wherein each of the plurality of agents receives a request from the analyzer for the results of the test scenario after the test scenario is complete, and communicates the results of the test scenario to the analyzer in response to the request.

36. The system of claim 30, wherein each of the plurality of agents includes shim adapters inserted within the application layer of the publish/subscribe clients coupled to the publish/subscribe network system.

37. The system of claim 36, wherein the shim adapters capture data objects propagating through the shim adapters within the application layer of the publish/subscribe clients.

38. The system of claim 36, wherein one of the shim adapters records a first timestamp on a data object when the data object enters the one of the shim adapters, and records a second timestamp on the data object when the data object exits the one of the shim adapters.

39. The system of claim 36, wherein the shim adapters simulate the publish/subscribe clients coupled to the publish/subscribe system during the test scenario when the publish/subscribe system is under development.

40. The system of claim 36, wherein the plurality of agents communicate shim results from the network layer to the analyzer, and wherein the analyzer analyzes the shim results to determine performance characteristics of the publish/subscribe network system over the application layer.

41. The system of claim 30, wherein the plurality of agents include network monitors that capture data objects propagating within the network layer of the publish/subscribe clients.

42. The system of claim 41, wherein one of the network monitors records a timestamp on a data object when the data object passes through the network layer of one of the publish/subscribe clients.

43. The system of claim 41, wherein the plurality of agents communicate network results from the network layer to the analyzer, and wherein the analyzer aggregates captured network packets within the network results, decodes the aggregated network packets, and analyzes the decoded network results to determine performance characteristics of the publish/subscribe network system over the network layer.

44. The system of claim 43, wherein the captured network packets conform to the remote method invocation (RMI) message protocol, and wherein the controller includes a decode module that performs a RMI decode.

45. The system of claim 30, wherein each of the plurality of agents includes shim adapters that capture data objects propagating within the application layer of the publish/subscribe clients, and network monitors that capture data objects propagating within the network layer of the publish/subscribe clients.

46. The system of claim 45, wherein the plurality of agents communicate shim results from the application layer and network results from the network layer to an integrated analyzer included in the controller.

47. The system of claim 46, wherein a decode module included in the controller decodes the network results, and wherein the integrated analyzer matches data objects within the decoded network results to data objects within the shim results, and analyzes the matched data objects to determine performance characteristics of the publish/subscribe network system over both the application layer and the network layer.

48. The system of claim 30, wherein the publish/subscribe system comprises one of a deployed publish/subscribe system or a developing publish/subscribe system.

* * * * *